US011951487B2

(12) United States Patent
Li et al.

(10) Patent No.: US 11,951,487 B2
(45) Date of Patent: Apr. 9, 2024

(54) SAME-CAVITY INTEGRATED VERTICAL HIGH-SPEED MULTISTAGE SUPERFINE PULVERIZING DEVICE AND METHOD FOR WALNUT SHELLS

(71) Applicants: QINGDAO UNIVERSITY OF TECHNOLOGY, Shandong (CN); RESEARCH INSTITUTE OF AGRICULTURAL MECHANIZATION XINJIANG ACADEMY OF AGRICULTURAL SCIENCES, Xinjiang (CN);

(Continued)

(72) Inventors: Changhe Li, Qingdao (CN); Mingzheng Liu, Qingdao (CN); Xiaoming Wang, Qingdao (CN); Huimin Yang, Qingdao (CN);

(Continued)

(73) Assignees: QINGDAO UNIVERSITY OF TECHNOLOGY, Shandong (CN); RESEARCH INSTITUTE OF AGRICULTURAL MECHANIZATION, XINJIANG ACADEMY OF AGRICULTURAL SCIENCES, Xinjiang (CN);

(Continued)

( * ) Notice: Subject to any disclaimer, the term of this patent is extended or adjusted under 35 U.S.C. 154(b) by 498 days.

(21) Appl. No.: 17/285,627

(22) PCT Filed: May 9, 2020

(86) PCT No.: PCT/CN2020/089391
§ 371 (c)(1),
(2) Date: Apr. 15, 2021

(87) PCT Pub. No.: WO2021/208164
PCT Pub. Date: Oct. 21, 2021

(65) Prior Publication Data

US 2022/0118461 A1 Apr. 21, 2022

(30) Foreign Application Priority Data

Apr. 13, 2020 (CN) .......................... 2020102864210

(51) Int. Cl.
*B02C 23/38* (2006.01)
*B02C 2/10* (2006.01)
(Continued)

(52) U.S. Cl.
CPC ............ *B02C 23/38* (2013.01); *B02C 19/005* (2013.01); *B02C 21/00* (2013.01); *B02C 23/02* (2013.01); *B02C 23/30* (2013.01)

(58) Field of Classification Search
CPC ......... B02C 23/38; B02C 23/02; B02C 23/30; B02C 19/005; B02C 19/065; B02C 21/00; B02C 2/10
See application file for complete search history.

(56) References Cited

U.S. PATENT DOCUMENTS

| | | | | |
|---|---|---|---|---|
| 1,871,127 | A * | 8/1932 | Nester | B02C 2/10 241/258 |
| 2,402,170 | A * | 6/1946 | Lund | B02C 2/10 241/300 |
| 5,330,112 | A | 7/1994 | Nagaoka et al. | |

FOREIGN PATENT DOCUMENTS

| | | |
|---|---|---|
| CN | 203316215 U | 12/2013 |
| CN | 104624299 A | 5/2015 |

(Continued)

OTHER PUBLICATIONS

English translate (KR101229859B1), retrieved date Oct. 16, 2023.*

(Continued)

*Primary Examiner* — Matthew Katcoff
*Assistant Examiner* — Mohammed S. Alawadi
(74) *Attorney, Agent, or Firm* — JCIPRNET

(57) ABSTRACT

The present invention discloses a same-cavity integrated vertical high-speed multistage superfine pulverizing device (Continued)

and method for walnut shells. The same-cavity integrated vertical high-speed multistage superfine pulverizing device for walnut shells includes a double-channel sliding type feeding device and a same-cavity integrated vertical pulverizing device. The same-cavity integrated vertical pulverizing device includes a material lifting disc and a same-cavity integrated vertical pulverizing barrel. A first-stage coarse crushing region, a second-stage fine crushing region, a third-stage pneumatic impact micro pulverizing region and a fourth-stage airflow mill superfine pulverizing region are disposed in the same-cavity integrated vertical pulverizing barrel. Walnut shells falling through the double-channel sliding type feeding device are uniformly lifted by the material lifting disc to a wedge-shaped gap of the first-stage coarse crushing region to be coarsely crushed, and coarsely crushed materials are finely crushed by the second-stage fine crushing region through a two-stage wedge-shaped direct-through gradually reducing gap. The third-stage pneumatic impact micro pulverizing region performs high-speed collision on finely crushed walnut shell particles, and walnut shell fine particles are carried by a high-speed airflow and are collided and violently rubbed to be pulverized. The microparticle grading is realized by the fourth-stage airflow mill superfine pulverizing region by using arc-shaped blades, and microparticles conforming to a particle size condition are attracted out through negative pressure attraction.

10 Claims, 18 Drawing Sheets

(71) Applicants: XINJIANG JIANG NING LIGHT INDUSTRIAL MACHINERY ENGINEERING TECHNOLOGY CO., LTD., Xinjiang (CN)

(72) Inventors: Xinping Li, Qingdao (CN); Xiangdong Liu, Qingdao (CN); Tuluhon Turdi, Qingdao (CN); Ji Che, Qingdao (CN); Lianxing Gao, Qingdao (CN); Huayang Zhao, Qingdao (CN); Xiaowei Zhang, Qingdao (CN); Yanbin Zhang, Qingdao (CN); Yifei Chen, Qingdao (CN); Yali Hou, Qingdao (CN)

(73) Assignees: XINJIANG JIANG NING LIGHT INDUSTRIAL MACHINERY ENGINEERING TECHNOLOGY CO., LTD., Xinjiang (CN)

(51) Int. Cl.

| | |
|---|---|
| ***B02C 19/00*** | (2006.01) |
| ***B02C 19/06*** | (2006.01) |
| ***B02C 21/00*** | (2006.01) |
| ***B02C 23/02*** | (2006.01) |
| ***B02C 23/30*** | (2006.01) |

(56) References Cited

FOREIGN PATENT DOCUMENTS

| | | | |
|---|---|---|---|
| CN | 106391183 | A | 2/2017 |
| CN | 206082651 | U | 4/2017 |
| CN | 108384595 | A | 8/2018 |
| CN | 208230046 | U | 12/2018 |
| CN | 209848984 | U | 12/2019 |
| CN | 210252452 | U | 4/2020 |
| CN | 212092690 | U | 12/2020 |
| IN | 110013900 | A | 7/2019 |
| KR | 101229859 | B1 * | 2/2013 |

OTHER PUBLICATIONS

Dec. 28, 2020 International Search Report issued in International Patent Application No. PCT/CN2020/089391.

Dec. 28, 2020 Written Opinion issued in International Patent Application No. PCT/CN2020/089391.

* cited by examiner

SAME-CAVITY INTEGRATED VERTICAL HIGH-SPEED MULTISTAGE SUPERFINE PULVERIZING DEVICE AND METHOD FOR WALNUT SHELLS

BACKGROUND

Technical Field

The present invention belongs to the technical field of superfine pulverization of walnut shells, and particularly relates to a same-cavity integrated vertical high-speed multistage superfine pulverizing device and method for walnut shells.

Related Art

The description in this section merely provides background information related to the present disclosure and does not necessarily constitute the prior art.

Walnut, also called as juglans and juglandis, is the top of four major dry fruits in the world, and is also an important economic tree species in China. In recent years, researchers at home and abroad deeply researched physical and chemical properties of materials of walnut shells, and found that the walnut shells have stable chemical properties, contain no toxic substances, have an extremely low dissolution amount in an acid or alkali solution, cannot cause a water quality deterioration phenomenon, and have a potential value of deep development and application. Through development and research, the walnut shells and products thereof can be applied to different fields according to their material characteristics: 1) The walnut shells are hard and crispy and have good wear resistance, and walnut shell particles with Mohs hardness of 8 and a particle size of 0.80-1.00 mm have an average compression limit of 165 N, and can be used as a material for polishing and grinding precise instruments and blunting superhard cutters. 2) The walnut shells have microporous surfaces and no toxicity, and can be used as frosting materials in washing and cosmetic products for daily use. 3) The walnut shells have a high porosity and a large specific surface area, contain groups such as hydroxyl, carboxyl and phosphoryl, and can be used as an active carbon and heavy metal adsorbent after being treated by a special process. 4) The walnut shells contain chemical substances such as juglone, flavonoid compounds and tannin, and the substances can be extracted to be used as medicines such as medical anti-tumor medicine, anti-oxidation medicine, and medicine for preventing stroke, heart diseases and arteriosclerosis prevention. 5) The walnut shells contain a large amount of lignin, and can be used as a grinding wheel pore-forming material. By aiming at the above application fields, in order to achieve the corresponding application purpose, walnut shell particles with large particle sizes (2 mm or greater) cannot meet the use requirements, and the walnut shells need to be crushed and pulverized to reach the particle size at a micron level, or even a superfine level of a submicron level. The application of superfine particles accounts for a very high proportion in a known application range of the walnut shells.

Although the walnut yield is high in China, and the walnut shells have the great potential application value, most food processing enterprises discard or perform concentrated incineration treatment on a great number of walnut shells generated after deep processing of walnuts at present, so that great waste of resources is caused. This is mainly because a superfine pulverizing device for walnut shells is relatively lagged, and cannot meet the production requirements, so that the value of the walnut shells is far from being "thoroughly used".

The pulverization can be divided into four types including coarse crushing, fine crushing, micro pulverization and superfine pulverization according to the particle size level of walnut raw materials and finished product particles, as shown in Table 1. The superfine pulverizing technology is a pulverizing technology for pulverizing material particles to 500 meshes (25 μm) or greater (the greater the mesh number is, the smaller the particle size is), and is divided into a chemical method and a physical method according to the properties. The chemical synthesis method has a low yield, high processing cost and narrow application range. The physical method cannot cause a chemical reaction of the materials, and maintains original physicochemical properties of the materials. The existing physical superfine pulverizing modes are divided into a dry method and a wet method according to different grinding media.

TABLE 1

Particle pulverization type and particle size range thereof

| Pulverization type | Particle size of raw materials | Particle size of finished product |
|---|---|---|
| Coarse crushing | 40-50 mm | 20-30 mm |
| Fine crushing | 20-30 mm | 50-10 mm |
| Micro pulverization | 5-10 mm | 50-100 μm |
| Superfine pulverization | 50-100 μm | <25 μm |

In a wet pulverizing process, solid particles suspended in liquid are pulverized to a micron or even nanometer level by shear force provided by the collision among a grinding medium, a grinding cavity wall and the material itself. For the wet pulverization, a colloid mill and a homogenizer are mainly used. According to the colloid mill and the homogenizer, a rotating gear (rotor) rotates at a high speed relative to a fixed gear (stator), the materials are effectively dispersed and pulverized under physical effects of strong shear force, rubbing, high-frequency vibration, high-speed vortex and the like received when passing through a gap (the gap is adjustable) between the fixed and rotating gears under the effect of external force, so as to achieve the superfine pulverizing effect. Both the colloid mill and the homogenizer are high-precision machinery which are not suitable for mass production. At the same time, since the walnut shells have water absorption performance, superfine powder particles after wet pulverization are more easily to generate particle agglomeration, and formidable difficulties are brought to subsequent application of the walnut shell superfine powder.

Superfine powder dry production methods mainly include the following types: a medium grinding type, a shearing type, and an airflow impact type. 1) The medium grinding type uses a mode of pulverizing materials by using acting force generated with moving grinding media, and representative equipment includes a ball mill and a stirring mill. The particle size of a product is great and nonuniform. A corresponding device has high energy consumption and great noise. 2) The mechanical shearing type superfine pulverization is suitable for tough materials such as traditional Chinese herbal medicine. When the mechanical shearing type superfine pulverization is used for hard and crispy walnut shell pulverization, the particle size is great, and the superfine requirement cannot be met. 3) The airflow impact type superfine pulverization achieves the goal of pulverizing the particles by enabling the particles to move with a supersonic airflow at a high speed and enabling the particles to collide and rub with each other violently. The types of the method mainly include a flat type, a circulating pipe type, an opposite spraying type and a fluidized bed type. An airflow type superfine pulverizing product has a uniform particle size. The opposite spraying type and the flat type are suitable for the superfine pulverization of materials with high Mohs hardness (≥7), but not suitable for mass crushing production. The airflow type superfine pulverization has a restrictive requirement on the particle size of a fed material. Particularly, when the fluidized bed type is used, if the particle size is too great (≥200 mm), the moving speed is decreased, and the pulverization degree is low; and if the particle size is too small (≤50 μm), over pulverization is easily caused. The circulating pipe type is suitable for mass production, but not suitable for a material with high Mohs hardness (<6).

Based on the above, it is suitable to prepare walnut shell superfine powder by the airflow type superfine pulverizing method according to the hard and crispy properties of the walnut shells. However, for walnut processing enterprises, after a great number of walnuts are broken to remove kernels, the size of the walnut shells is generally 10-30 mm, and cannot be directly conveyed into a corresponding pneumatic superfine pulverizing device for pulverizing treatment. According to a general flow process for pulverizing the walnut shells at present, a crushing device is used to primarily pulverize the walnut shells to reach a proper particle size range, and then, the walnut shells are conveyed into a superfine pulverizing device for superfine uniform pulverization, but the whole process is complicated and long, the energy consumption is high, the efficiency is low, the cost is increased, and the particle size range of the walnut shell particles in the primarily pulverizing process is wide, so that the subsequent superfine pulverization is not facilitated. Further, the walnut shells per se contain grease, and a microparticle agglomeration phenomenon is easy to occur in the pulverizing process only through a high-speed airflow mill. Further, it is difficult to provide energy for efficient superfine pulverization of a great number of walnut shell particles in a short time singly through airflow impact, resulting in pulverization rate reduction and great energy consumption increase.

A patent with an application number of CN201910349342.7 discloses walnut shell pulverizing equipment including a support bottom frame, a pulverizing barrel, a pulverizing component and a stirring and material conveying mechanism. An inner cavity of the pulverizing barrel is a conical cavity. A support plate is fixedly connected to an outer side of the pulverizing barrel, and is supported by support tabletops at two sides of the support bottom frame through jacking springs. The pulverizing component includes a pulverizing cone coaxially extending into the inner cavity of the pulverizing barrel to form a pulverizing annular cavity. A material conveying spiral belt is manufactured on an outer cone surface of the pulverizing cone. A transmission shaft is connected to a center position of an upper portion of the pulverizing cone, and a support shaft is connected to a center position of a lower portion of the pulverizing cone. An upper end portion of the transmission shaft is connected with a motor. The motor is fixedly supported above the pulverizing barrel through a plurality of support arms. A lower end of the support shaft is supported by a lower shaft seat. The lower shaft seat is installed on a cross beam of the support bottom frame. The stirring and material conveying mechanism includes a stirring shaft support arm. One end of the stirring shaft support arm is connected with a motor output shaft, and the other end is provided with a stirring shaft. A transmission mechanism is connected between an upper end of the stirring shaft and the motor output shaft. A stirring rod is installed at a lower end portion of the stirring shaft. The device has the advantages that the structure is simple, and the operation is convenient, but the pulverizing degree is low, the particle size of a product is great and nonuniform, and the superfine pulverization requirement cannot be met.

A patent with an application number of CN201320351529.9 discloses a superfine pulverizing machine including a machine shell, a pulverizing disc, a tooth ring, a flow guide ring and a grading impeller. A feeding opening is formed in a middle portion of the machine shell. A lower portion of the machine shell is provided with an air inlet. An upper portion of the machine shell is provided with a discharging opening. The pulverizing disc and the grading impeller are rotatably connected into the machine shell. The pulverizing disc is positioned under the grading impeller. A plurality of hammers are disposed on an edge of the pulverizing disc. The tooth ring is fixed in the machine shell, and surrounds the pulverizing disc. The flow guide ring includes an inner ring and an outer ring which are connected. An opening is formed in the outer ring, the outer ring is fixed onto the machine shell, the opening communicates with the feeding opening, and the inner ring surrounds the grading impeller. Through cooperation of the hammers and the tooth ring, materials in the machine shell can be cut and pulverized at a high speed. Through screening by the grading impeller, fiber superfine powder meeting the fineness requirement is conveyed out from the discharging opening under the effect of external negative pressure, and big particles which do not meet the requirement fall down to be pulverized again. The device has the advantages that continuous pulverization production is realized, and the processing efficiency is improved. However, the device is mainly used for superfine pulverization of fiber type tough materials, for hard and crispy materials such as walnut shells, effective superfine pulverization is difficult to perform only through a movement pair between the hammers and the tooth ring, additionally, the airflow mainly achieves the conveying effect, and the pulverizing effect is poor. Devices for superfine pulverization on foods or medicines at present are mainly devices in this type.

From the literature retrieval at home and abroad, the superfine pulverization industrial application of walnut shells is not found. Although pulverizing methods used by various research groups are different, these researches are only limited to the application test research of the walnut shell superfine powder, i.e., small-batch micro powder particles with great particle sizes, and most materials do not reach the superfine powder standard. The technical bottleneck of the efficient superfine pulverization of high-hardness materials has not been broken through all the time. Through retrieval, a multistage integrated device for "coarse crushing, fine crushing, micro pulverization and superfine pulverization" is not available for superfine pulverization of walnut shell materials at present. According to most devices, walnut shells after kernel removal are subjected to crushing treatment or the walnut shells are subjected to crushing and pulverization work procedures to reach a certain particle size, and then, the walnut shells are conveyed into a pneumatic superfine pulverizing device for uniform superfine pulverization, so that a production line is complicated and long, and the cost is increased.

SUMMARY

In order to overcome the defects in the prior art, the present invention provides a same-cavity integrated vertical high-speed multistage superfine pulverizing device for walnut shells. The device integrates "coarse crushing, fine crushing, micro pulverization and superfine pulverization", and solves the problems of uncontrollable particle size of particles, nonuniform particle size distribution, low pulverization precision and long and complicated pulverization flow process of the pulverization process due to hard texture of the walnut shells.

To achieve the foregoing objective, one or more embodiments of the present invention provide the following technical solutions:

A high-speed multistage superfine pulverizing device for walnut shells includes:

a double-channel sliding type feeding device and a same-cavity integrated vertical pulverizing device.

The double-channel sliding type feeding device includes a first spiral inclined chute and a second spiral inclined chute in opposite arrangement. Walnut shells slide to the same-cavity integrated vertical pulverizing device through the first spiral inclined chute and the second spiral inclined chute.

The same-cavity integrated vertical pulverizing device includes a material lifting disc, a first-stage coarse crushing region, a second-stage fine crushing region, a third-stage pneumatic impact micro pulverizing region and a fourth-stage airflow mill superfine pulverizing region.

Walnut shells falling through the double-channel sliding type feeding device are uniformly lifted by the material lifting disc to a wedge-shaped gap of the first-stage coarse crushing region to be coarsely crushed, and coarsely crushed materials are finely crushed by the second-stage fine crushing region through a two-stage wedge-shaped direct-through gradually reducing gap.

The third-stage pneumatic impact micro pulverizing region performs high-speed collision on finely crushed walnut shell particles, and walnut shell fine particles are carried by a high-speed airflow and are collided and violently rubbed to be pulverized.

The fourth-stage airflow mill superfine pulverizing region performs further collision and rubbing on the micro pulverized walnut shell particles through a high-speed airflow to realize superfine pulverization, the microparticle grading is realized by using arc-shaped blades, and microparticles conforming to a particle size condition are attracted out through negative pressure attraction.

To achieve the foregoing objective, one or more embodiments of the present invention provide the following technical solutions:

On the other hand, a high-speed multistage superfine pulverizing method for walnut shells is also disclosed, and includes:

lifting walnut shells after being broken to remove kernels to a wedge-shaped gap of a first-stage coarse crushing region, so that the walnut shells receive high-speed collision, shearing and extrusion effects of fine-pitch longitudinal trapezoidal teeth of a stator and a rotor in a process of sliding down along the wedge-shaped gap when the size of the walnut shells is the same as the size of a certain position of the wedge-shaped gap, and the walnut shells are crushed into coarse particles to fall into a second-stage fine crushing region to realize coarse crushing;

enabling the coarsely crushed walnut shell particles to slide down along an inner wall since the second-stage fine crushing region is a multistage wedge-shaped direct-through gradually reducing gap, along with gradual reduction of the gap, enabling the coarse particles to receive the high-speed shearing and extrusion effects of fine-pitch transverse sharp patterned teeth on a stator and a rotor, and further crushing the coarse particles into fine particles;

sliding the fine particles to a third-stage pneumatic impact micro pulverizing region, and enabling the fine particles to move at a high speed through receiving the strong-force carrying effect of a supersonic airflow, so that the walnut shell fine particles violently rub and collide with each other in the process; enabling the particles to receive strong collision by spiral gratings rotating around a lower main shaft at a high speed during high-speed drifting, rebounding the collided particles to a rough barrel wall for repeated collision and rubbing, finally pulverizing the particles into microparticles, and enabling the microparticles to enter a fourth-stage airflow mill superfine pulverizing region along with an upward spiral airflow; and enabling the walnut shell microparticles entering the fourth-stage airflow mill superfine pulverizing region to receive high-speed collision and rubbing in a supersonic airflow mill to be further pulverized into superfine powder ascending along with the airflow, and attracting out and collecting powder particles meeting a particle size requirement through negative pressure attraction greater than centrifugal force through screening by grading blades.

The foregoing one or more technical solutions have the following beneficial effects:

The same-cavity integrated vertical high-speed multistage superfine pulverizing device for walnut shells of the present disclosure integrates four stages of "coarse crushing, fine crushing, micro pulverization and superfine pulverization", has the advantages of compact structure, short pulverization flow process, great walnut shell feeding amount, great treatment capacity and high efficiency, and realizes controllable particle size of particles, uniform particle size distribution and high superfine pulverization particle precision of the pulverization process of the walnut shells.

The same-cavity integrated vertical high-speed multistage superfine pulverizing device for walnut shells of the present disclosure has a reasonable and simple structure, and is easy to operate. Major modules of a power source, the double-channel sliding type feeding device and the same-cavity integrated vertical pulverizing device of the device are all connected onto a machine frame through bolts. All components of a critical module of the same-cavity integrated vertical pulverizing device are connected with each other through bolts, mounting or dismounting is easy, and critical easily damaged parts can be favorably replaced.

According to the technical solutions of the present disclosure, through "multistage same-cavity integration", i.e., the flow process of "coarse crushing, fine crushing, micro pulverization and superfine pulverization", walnut shells are subjected to superfine pulverization, active control can be realized on the particle size of each stage of walnut shell particles, and the pulverization quality is improved. At the same time, the flow process is shortened, and the production efficiency is greatly improved. Further, by aiming at the material characteristics of the walnut shells, different mechanisms or devices are used for each stage of crushing or pulverization. Important significance is realized on improving the quality of the walnut shell superfine powder.

BRIEF DESCRIPTION OF THE DRAWINGS

The accompanying drawings constituting a part of the present invention are used to provide a further understanding of the present invention. The exemplary embodiments of the present invention and descriptions thereof are used to explain the present invention, and do not constitute an improper limitation of the present invention.

FIG. 10(*b*) is an axonometric diagram of a spiral material guide inner chute inside the same-cavity integrated vertical pulverizing device.

FIG. 24(*a*) is a schematic partial enlargement structure diagram of a wedge-shaped gap of the first-stage coarse crushing region.

FIG. 24(*b*) is a partial enlargement top view of an upper stator.

FIG. 24(*c*) is a partial enlargement top view of an upper rotor.

FIG. 24(*d*) is a top view of a stress mode of walnut shells in the wedge-shaped gap.

FIG. 24(*e*) is a schematic partial enlargement structure diagram of fine-pitch longitudinal trapezoidal teeth of the upper rotor and the upper stator.

FIG. 25(*a*) is a schematic partial enlargement structure diagram of a two-stage wedge-shaped direct-through gradually reducing gap of the second-stage coarse crushing region.

FIG. 25(*b*) is a partial enlargement sectional view of a lower stator.

FIG. 25(*c*) is a partial enlargement sectional view of a lower rotor.

FIG. 25(*d*) is a schematic diagram of a stress mode of coarsely crushed walnut shells in the wedge-shaped gap.

FIG. 25(*e*) is a schematic partial enlargement structure diagram of fine-pitch transverse sharp patterned teeth of the lower rotor and the lower stator.

FIG. 26(*a*) is an axonometric diagram of a high-speed rotation collision pulverizing auxiliary device.

FIG. 26(*b*) is a schematic structure diagram of a single spiral crushing grating at an upper portion of the high-speed rotation collision pulverizing auxiliary device.

FIG. 26(*c*) is a schematic structure diagram of adjacent spiral crushing gratings at the upper portion and a lower portion of the high-speed rotation collision pulverizing auxiliary device.

FIG. 26(*d*) is a schematic diagram of distribution of a lower airflow pipeline of a third-stage pneumatic impact micro pulverizing region.

FIG. 26(*e*) is a schematic diagram of an inner lining layer of the third-stage pneumatic impact micro pulverizing region.

FIG. 26(*f*) is a schematic partial enlargement structure diagram of a position b in FIG. 24(*e*).

FIG. 26(*g*) is a schematic partial enlargement diagram of tooth-shaped micro bulges at an inner surface of the inner lining layer of the third-stage pneumatic impact micro pulverizing region.

FIG. 26(*h*) is a sectional view of a spray nozzle structure of the third-stage pneumatic impact micro pulverizing region.

FIG. 27(*a*) is a sectional diagram of a spray nozzle structure of the fourth-stage airflow mill superfine pulverizing region in a position c in FIG. 25.

FIG. 27(*b*) is a schematic partial enlargement structure diagram of a grading device of a position din FIG. 25.

FIG. 28(*b*) is a top view of the negative pressure material attraction cavity.

Figure 1:
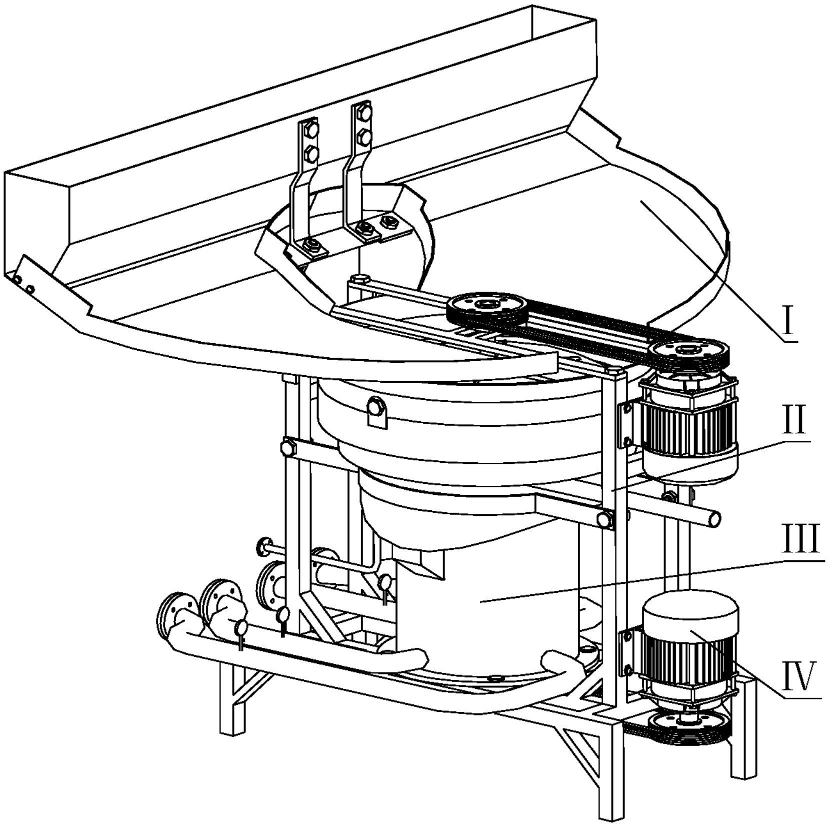
FIG. 1 is an axonometric diagram of a mechanical energy and pneumatic impact energy cooperative same-cavity integrated vertical high-speed multistage superfine pulverizing device for walnut shells.

In the figures, I denotes a double-channel sliding type feeding device; II denotes a machine frame; III denotes a same-cavity integrated vertical pulverizing device; IV denotes a power source.

I0101 denotes a first spiral inclined chute; I0102 denotes a second spiral inclined chute; I02 denotes a connecting plate; I03 denotes a feeding hopper; I0401 denotes a first bending connecting plate; I0402 denotes a second bending connecting plate; I0501 denotes a third bending connecting plate; I0502 denotes a fourth bending connecting plate; I06 denotes a first feeding hopper fastening bolt; I07 denotes a first feeding hopper fastening nut; I08 denotes a second feeding hopper fastening bolt; I09 denotes a second feeding hopper fastening nut; I10 denotes a first bending connecting plate fastening bolt; I11 denotes a first bending connecting plate fastening nut; I12 denotes a second bending connecting plate fastening bolt; I13 denotes a third bending connecting plate fastening bolt.

II01 denotes a horizontal chassis seat; II0201 denotes a first vertical upright post; II0202 denotes a second vertical upright post; II0203 denotes a third vertical upright post; II0204 denotes a fourth vertical upright post; II0301 denotes a first dismountable fixed arc plate; II0302 denotes a second dismountable fixed arc plate; II0401 denotes a first dismountable support plate; II0402 denotes a second dismountable support plate; II0501 denotes a first support plate; II0502 denotes a second support plate.

III01 denotes an upper belt pulley; III02 denotes a first bearing; III03 denotes a material guide hopper; III04 denotes a fixing plate; III05 denotes a same-cavity integrated vertical pulverizing barrel; III06 denotes a lower airflow pipeline; III07 denotes a fourth bearing; III08 denotes a lower belt pulley; III09 denotes an upper main shaft; III10 denotes a material lifting disc; III11 denotes an upper rotor; III12 denotes a lower rotor; III13 denotes a negative pressure material attraction cavity; III14 denotes a connecting disc; III15 denotes an upper airflow pipeline; III16 denotes a spiral crushing grating; III1601 denotes a first upper crushing grating; III1601-*a* denotes an upper straight grating; III1601-*b* denotes a lower straight grating; III1602 denotes a second upper crushing grating; III1603 denotes a third upper crushing grating; III1604 denotes a fourth upper crushing grating; III1605 denotes a fifth lower crushing grating; III1605-*c* denotes an upper straight grating; 1606 denotes a sixth lower crushing grating; III1607 denotes a seventh lower crushing grating; III1608 denotes an eighth lower crushing grating; III17 denotes a second bearing; III18 denotes a superfine pulverizing barrel; III19 denotes an upper connecting ring; III20 denotes a connecting grating plate; III21 denotes a lower connecting disc; III22 denotes a third bearing; III23 denotes a lower main shaft; III24 denotes a material guide retainer ring; III25 denotes an upper stator; III26 denotes a sleeve; III27 denotes a lower stator; III28 denotes an arc grading blade; III29 denotes a spiral material guide inner chute; III30 denotes a feeding hopper; III31 denotes a material guide hopper fastening bolt; III32 denotes a material guide hopper fastening nut; III33 denotes an upper stator fixing bolt; III34 denotes a lower stator fixing bolt; III35 denotes a dismountable airflow pipe fastening bolt; III36 denotes a dismountable airflow pipe fastening nut; III37 denotes a dismountable airflow pipe; III38 denotes an upper airflow pipeline; III39 denotes a connecting disc fastening bolt; III40 denotes a connecting disc fastening nut; III41 denotes a superfine pulverizing barrel fastening bolt; III42 denotes a superfine pulverizing barrel fastening nut; III43 denotes a grading blade fastening bolt; III44 denotes a grading blade fastening nut; III45 denotes a third bearing seat fastening nut; III46 denotes a third bearing seat fastening bolt; III47 denotes a fourth bearing seat fastening nut; III48 denotes a fourth bearing seat fastening bolt; III49 denotes a first bearing seat fastening bolt; III50 denotes a first bearing seat fastening nut; III51 denotes a material shifting tooth; III52 denotes an upper stop bolt; III53 denotes an upper stop nut; III54 denotes a second bearing seat fastening bolt; III55 denotes a second bearing seat fastening nut; III56 denotes a negative pressure material attraction cavity fastening bolt; III57 denotes a negative pressure material attraction cavity fastening nut; III58 denotes a grading blade connecting disc; III59 denotes a lower stop bolt; III60 denotes a lower stop nut; III61 denotes a stop sleeve; III62 denotes an inner lining layer; III63 denotes a lower spray nozzle; III64 denotes a lower spray nozzle fastening nut; III65 denotes a lower spray nozzle fastening bolt; III66 denotes a lower spray nozzle fixing bolt; III67 denotes an upper spray nozzle; III68 denotes an upper spray nozzle fastening nut; III69 denotes an upper spray nozzle fastening bolt; III70 denotes an upper spray nozzle fixing bolt; IV02 denotes a second motor; and IV01 denotes a first motor.

DETAILED DESCRIPTION

It should be noted that, the following detailed descriptions are all exemplary, and are intended to provide further descriptions of the present invention. Unless otherwise specified, all technical and scientific terms used herein have the same meanings as those usually understood by a person of ordinary skill in the art to which the present invention belongs.

It should be noted that the terms used herein are merely used for describing specific implementations, and are not intended to limit exemplary implementations of the present invention. As used herein, the singular form is intended to include the plural form, unless the context clearly indicates otherwise. In addition, it should further be understood that terms “include” and/or “comprise” used in this specification indicate that there are features, steps, operations, devices, components, and/or combinations thereof.

The embodiments in the present invention and features in the embodiments may be mutually combined in case that no conflict occurs.

Embodiment I

Referring to FIG. 1, the present embodiment discloses a same-cavity integrated vertical high-speed multistage superfine pulverizing device for walnut shells. The device integrates mechanical energy and pneumatic impact energy cooperation vertical same-cavity, and consists of four portions including a double-channel sliding type feeding device I, a machine frame II, a same-cavity integrated vertical pulverizing device III and a power source IV. The double-channel sliding type feeding device I is positioned on a top of the machine frame II, and the same-cavity integrated vertical pulverizing device III is positioned at a lower portion of the double-channel sliding type feeding device I, and the power source IV is positioned at one side of the machine frame II.

Figure 2:
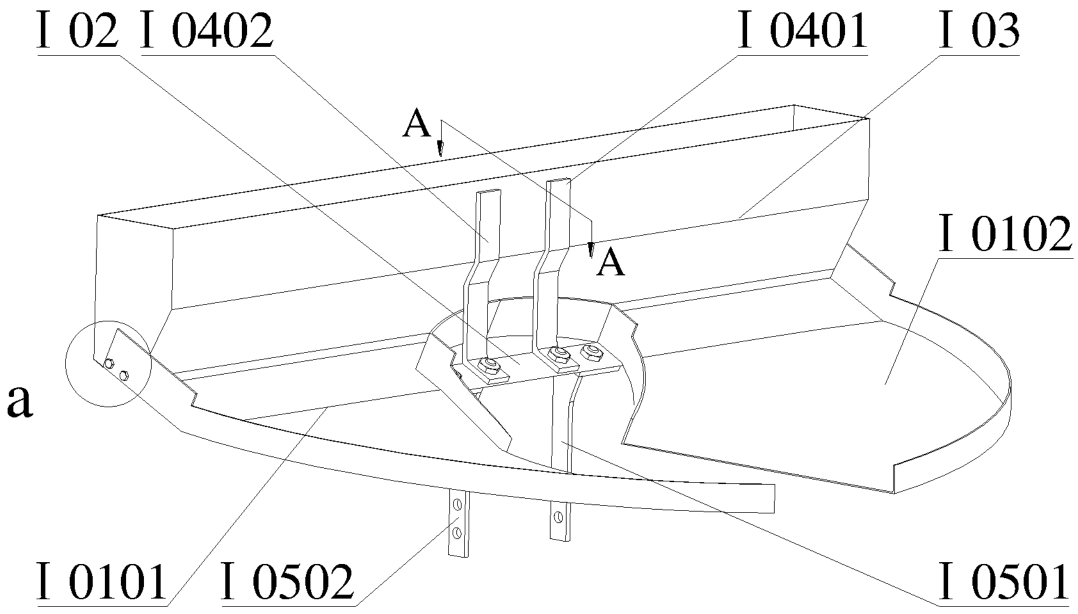
FIG. 2 is an axonometric diagram of a double-channel sliding type feeding device.
Figure 4:
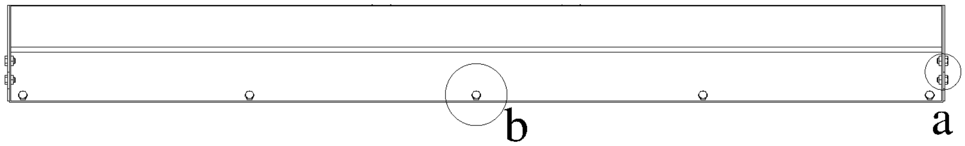
FIG. 4 is a top view of a feeding hopper.
Figure 4A:
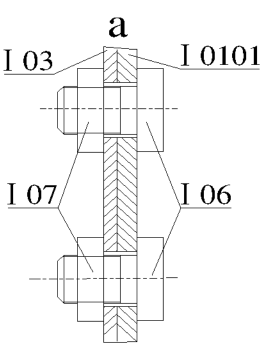
FIG. 4*a* is a partial enlargement sectional view of a position a in FIG. 2.

As shown in FIG. 2, a first spiral inclined chute I0101 and a second spiral inclined chute I0102 of the double-channel sliding type feeding device I are in opposite arrangement, are welded onto a connecting plate I02, and form a whole. A first bending connecting plate I0401 and a second bending connecting plate I0402 are welded onto a feeding hopper I03, and form a whole. The feeding hopper I03 is positioned above a feeding opening of the first spiral inclined chute I0101 and the second spiral inclined chute I0102, and is connected into a whole through bolts. In conjunction with FIG. 4 and FIG. 4*a*, the feeding hopper I03 and the first spiral inclined chute I0101 are connected through a group (two pairs) of first feeding hopper fastening bolts I06 and first feeding hopper fastening nuts I07 in a position a, and the other ends are connected in the same connecting mode.

Figure 3:
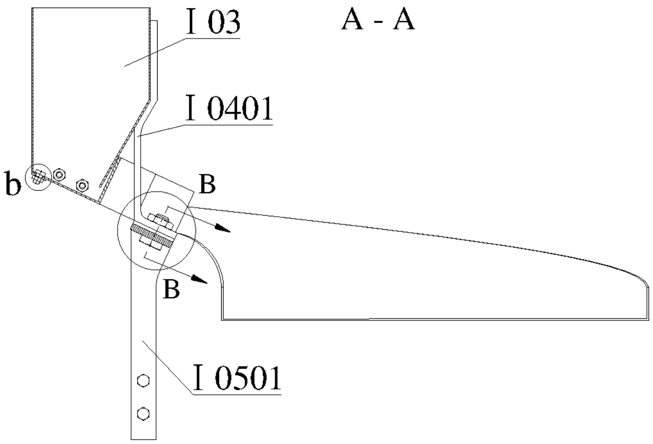
FIG. 3 is an A-A cross section sectional view in FIG. 2.
Figure 4B:
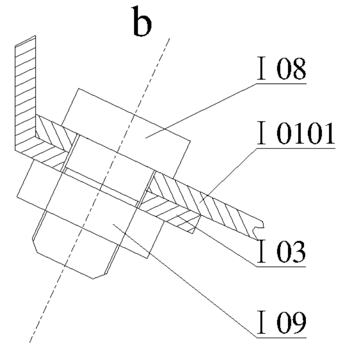
FIG. 4*b* is a partial enlargement sectional view of a position b in FIG. 3.

FIG. 3 is an A-A sectional view of the double-channel sliding type feeding device I. In conjunction with FIG. 4 and FIG. 4*b*, the feeding hopper I03 and the first spiral inclined chute I0101 are connected through a pair of second feeding hopper fastening bolt I08 and first feeding hopper fastening nut I09 in a position b, and the feeding hopper I03 totally adopts 5 pairs of the above connection.

Figure 5:
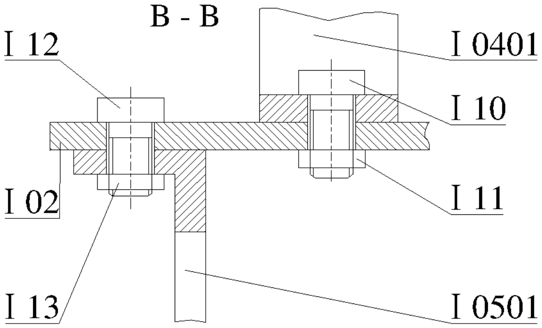
FIG. 5 is a B-B cross section sectional view in FIG. 3.

FIG. 5 is a B-B sectional view. The first bending connecting plate I0401 is fixed onto the connecting plate I02 through a first bending connecting plate fastening bolt I10 and a first bending connecting plate fastening nut I11. A third bending connecting plate I0501 is connected to the connecting plate I02 through a third bending connecting plate fastening bolt I12 and a third bending connecting plate fastening nut I13, so that the double-channel sliding type feeding device I is fixed onto the machine frame II. The second bending connecting plate I0402 and the fourth bending connecting plate I0502 are fixed onto the connecting plate I02 in the same connecting mode.

The double-channel sliding type feeding device of the present disclosure is provided with double spiral inclined chutes, chute outlets are opposite, and a width of the chute outlet is identical to a diameter of a top end of the barrel of the same-cavity integrated vertical pulverizing device, so that a great number of walnut shells can be fed from the feeding hopper, are then divided to fall into the double spiral inclined chutes, and slowly and uniformly slide into the material lifting disc. The walnut shell materials can realize batch fast and uniform falling into the wedge-shaped gap of the first-stage coarse crushing region under the effect of centrifugal force of the material lifting disc rotating at a high speed.

Figure 6:
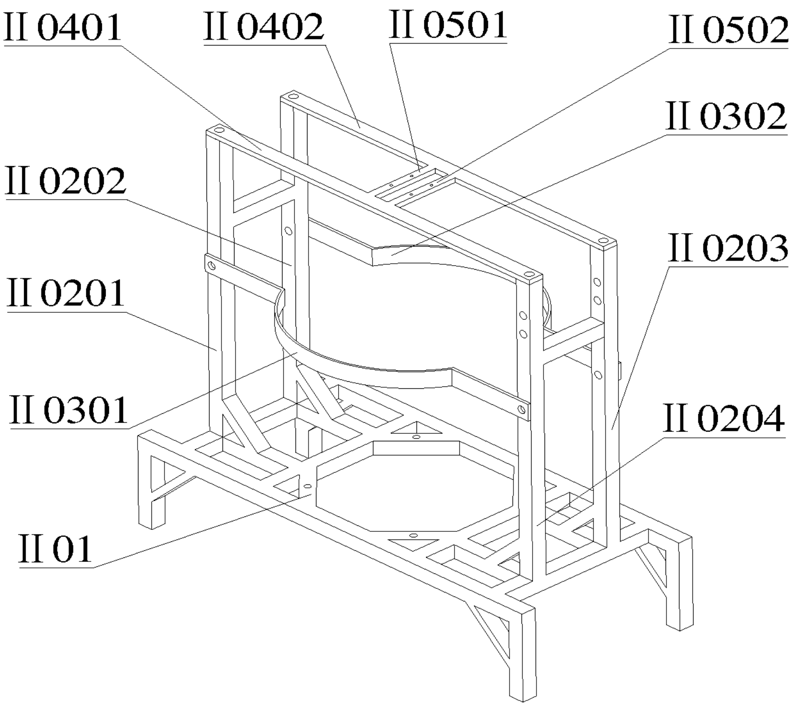
FIG. 6 is an axonometric assembly diagram of a machine frame.

A specific structure of the machine frame II is as shown in FIG. 6, and the machine frame includes a horizontal chassis seat, fixed arc plates and support plates. A plurality of vertical upright posts are disposed on the horizontal chassis seat. The two fixed arc plates are respectively connected onto the corresponding vertical upright posts to form a space for accommodating the same-cavity integrated vertical pulverizing device together with the horizontal chassis seat. The support plates in staggered arrangement are disposed on the upper ends of the vertical upright posts, and the double-channel sliding type feeding device is fixed through the support plates.

The first vertical upright post II0201, the second vertical upright post II0202, the third vertical upright post II0203 and the fourth vertical upright post II0204 are welded onto the horizontal chassis seat II01 to form a whole. The first dismountable fixed arc plate II0301 is connected onto the first vertical upright post II0201 and the fourth vertical upright post II0204 through bolts, and the second dismountable fixed arc plate II0302 is connected ono the second vertical upright post II0202 and the third vertical upright post II0203 through bolts. The first dismountable fixed arc plate II0301 and the second dismountable fixed arc plate II0302 achieve a stabilization effect on the same-cavity integrated vertical pulverizing device III. The first support plate II0501 and the second support plate II0502 are welded onto the first dismountable support plate II0401 and the second dismountable support plate II0402 to form a whole. The first dismountable support plate II0401 is connected onto the first vertical upright post II0201 and the fourth vertical upright post II0204 through bolts, and the second dismountable support plate II0402 are connected onto the second vertical upright post II0202 and the third vertical upright post II0203 through bolts.

The power source is connected with the vertical upright posts, the double-channel sliding type feeding device is connected with the vertical upright posts, and the same-cavity integrated vertical pulverizing device is connected with the horizontal chassis seat.

The power source is two motors, and is connected with the vertical upright posts in a vertical back direction. A high-power motor is positioned at an upper side, a rotating speed is 2000 r/min, the high-power motor is connected with an upper belt pulley through a belt, and the upper belt pulley is in keyed joint with an upper main shaft. A low-power motor is positioned at a lower side, a rotating speed is 1500 r/min, the low-power motor is connected with a lower belt pulley through a belt, and the lower belt pulley is in keyed joint with a lower main shaft.

Figure 9:
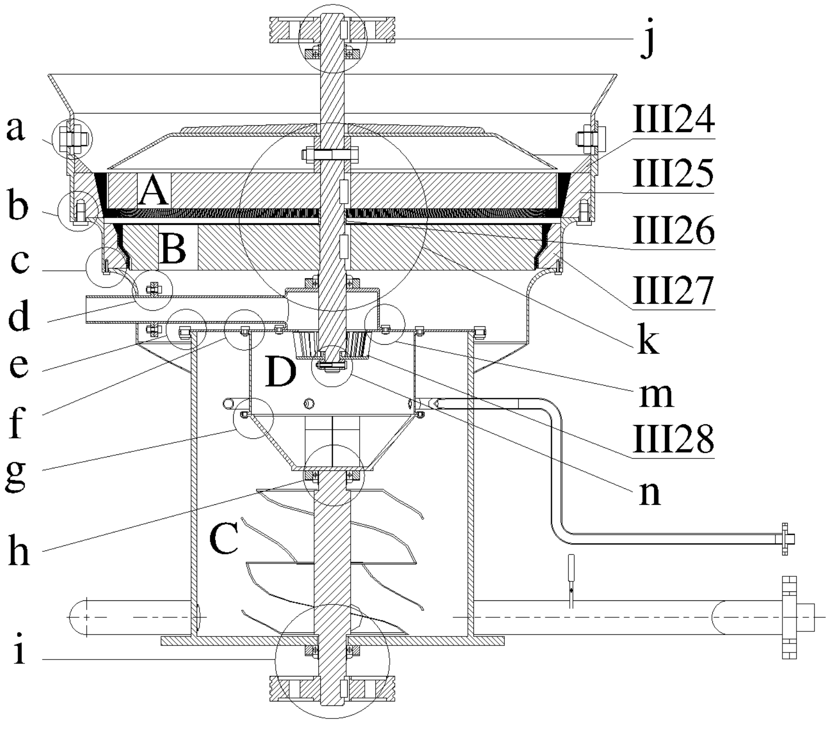
FIG. 9 is a C-C cross section sectional view of the same-cavity integrated vertical pulverizing device in FIG. 6.

As shown in FIG. 9, the same-cavity integrated vertical pulverizing device III consists of a material lifting disc III10, a first-stage coarse crushing region A, a second-stage fine crushing region B, a third-stage pneumatic impact micro pulverizing region C and a fourth-stage airflow mill super-fine pulverizing region D. A structure is compact, and a technical flow process is short.

The material lifting disc synchronously rotates at a high speed along with the upper main shaft. Material shifting teeth are disposed on the top of the material lifting disc, and falling walnut shells are uniformly lifted into a wedge-shaped gap of the first-stage coarse crushing region.

The first-stage coarse crushing region consists of an upper stator and an upper rotor. Coarse crushing is realized through the wedge-shaped gap. The upper stator is fixed to a barrel wall, and the upper rotor is in keyed joint with the upper main shaft to synchronously rotate. The upper stator and the upper rotor both use fine-pitch longitudinal trapezoidal teeth. Through the first-stage coarse crushing region, the size of walnut shell particles can be controlled at 15 mm or smaller.

The first-stage coarse crushing region of the present disclosure is provided with an upper mover (movable tooth ring) and an upper stator (fixed tooth ring). The tooth types of the upper mover, the upper stator and the upper rotor are all fine-pitch longitudinal trapezoidal teeth. Crushing incapability since crushed shells are clamped in the gap can be prevented, and the collision, extrusion and shearing crushing on the walnut shells with the arc-shaped initial state can be facilitated. The wedge-shaped gap (with a wider upper portion and a narrower lower portion) is formed between the upper rotor and the upper stator, and a size of an upper end inlet is greater than a maximum size of the walnut shells, so that the walnut shells are favorable to effectively entering the wedge-shaped gap. The inner tooth ring of the upper stator is made into a slope shape, and the falling speed of the walnut shells can be favorably decreased, so that the walnut shells can be sufficiently crushed. By setting a size of a lower end outlet of the wedge-shaped gap, the controllable size of the coarsely crushed walnut shell particles entering the next stage of crushing region can be realized.

The second-stage fine crushing region consists of a lower stator and a lower rotor, and fine crushing is realized through a two-stage wedge-shaped direct-through gradually reducing gap. The lower stator is fixed to the barrel wall, and the lower rotor is in keyed joint with the upper main shaft to synchronously rotate. The lower stator and the lower rotor both use fine-pitch transverse sharp patterned teeth. Through the second-stage fine crushing region, the size of the walnut shell particles can be controlled at 5 mm or smaller.

The second-stage fine crushing region of the present disclosure is provided with a lower rotor (movable tooth ring) and a lower stator (fixed tooth ring), the tooth types of the lower rotor and the lower stator are both fine-pitch transverse sharp patterned teeth. Crushing incapability since crushed shells are clamped in the gap can be prevented, and extrusion and shearing crushing on the walnut shells with the flat-shaped coarse crushing state can be facilitated. A two-stage wedge-shaped direct-through gradually reducing gap between the lower rotor and the lower stator can favorably decrease the falling speed of the walnut shells, so that the walnut shells can be sufficiently and uniformly crushed, and the crushing size of the walnut shell particles can be favorably reduced. By setting a size of a lower end of a gap outlet, the size of the walnut shell particles can meet the particle size requirement of pneumatic pulverization.

The third-stage pneumatic impact micro pulverizing region consists of lower airflow guide pipes, lower spray nozzles, spiral crushing gratings, a barrel and an inner lining layer. The lower airflow guide pipes are totally four groups, and are respectively connected with the lower spray nozzles (four groups) through bolts. The lower spray nozzles are converging-diverging supersonic Laval spray nozzles, are totally four groups, and are connected with the barrel through bolts. Spray nozzle outlets are connected with the barrel in a penetrating way, so that mounting or dismounting is convenient, and spray nozzle abrasion can be prevented. The spiral crushing gratings are welded to the lower main shaft, perform high-speed collision on the finely crushed walnut shell particles and assist the pulverization. Tooth-shaped micro bulges are disposed on an inner surface of the inner lining layer, and the walnut shell fine particles are carried by a high-speed airflow and are collided and violently rubbed with the micro bulges to achieve a pulverization effect. Through the third-stage pneumatic impact micro pulverizing region, the size of the walnut shell particles can be controlled at 50 μm or smaller.

The third-stage pneumatic impact micro pulverizing region of the present disclosure is provided with four groups of compressed gas spray nozzles positioned at the outer barrel bottom. An angle formed by each of the spray nozzles and the outer barrel diameter is 20°, so that a spiral airflow can be favorably formed, and materials are enabled to enter a crushing grating high-speed collision region. The inside of the spray nozzle is of a converging-diverging structure, and outlet airflow supersonic speed can be realized. The supersonic airflow carries the fine particles to move at a high speed, violent mutual collision and rubbing are facilitated, and micro pulverization is realized. Spray nozzle outlets penetrate through the outer barrel wall, and do not need to extend to the inside of the outer barrel, and spray nozzle abrasion can be effectively prevented. An inner lining layer of the outer barrel wall is made of a wear-resistant material of high manganese steel, and tooth-shaped micro bulges are formed on the inner surface of the circumference of the inner lining layer, the abrasion of the outer barrel wall can be reduced, the friction between the microparticles and the barrel wall can be increased, and the pulverization is facilitated. A lower main shaft is disposed in the outer barrel, an upper group and a lower group of spiral crushing gratings, four in each group, are welded onto the lower main shaft, and the two adjacent spiral crushing gratings are in 90° arrangement. The lower main shaft rotates at a high speed through being driven by the motor. The eight spiral crushing gratings collide with the walnut shell particles at a high speed, collision crushing on a great number of fine particles can be realized, an assistance effect is achieved on insufficient energy provided by pneumatic force for the great number of fine particles (the particle amount is increased, the airflow amount needs to be increased, and the energy consumption is increased), the further pulverization of the particles is facilitated, and the energy consumption reduction is also facilitated.

The fourth-stage airflow mill superfine pulverizing region consists of upper airflow guide pipes, upper spray nozzles, a grading device, an inner barrel and a negative pressure material attraction device. The upper airflow guide pipes are totally four groups, and are respectively connected with the upper spray nozzles (four groups) through bolts. The upper spray nozzles are converging-diverging supersonic Laval spray nozzles, are totally four groups, and are connected with the barrel through bolts. Spray nozzle outlets are connected with the inner barrel in a penetrating way. The grading device mainly consists of arc-shaped blades. Each position of an arc-shaped blade channel has the same cross section area, the pressure difference resistance is reduced, the flow field between the blades is stable, and the microparticle grading is favorably realized. The negative pressure material attraction device provides negative pressure attraction, so that the microparticles conforming to the particle size condition are attracted out to be further collected. Through the fourth-stage airflow mill superfine pulverizing region D, the size of the walnut shell particles can be controlled at 25 μm or smaller.

The fourth-stage airflow mill superfine pulverizing region of the present disclosure is provided with four groups of spray nozzles as in the third-stage pneumatic impact micro pulverizing region, and the structures are also identical. The inner lining layer of the inner barrel wall is also provided with a wear-resistant material, and tooth-shaped micro bulges are formed on the circumference surface. The inner barrel top is provided with an arc-shaped blade grading device, and the grading on the superfine particles meeting the condition can be realized. The grading blades are in an arc shape, the axial acting force of grading wheel fluid is small, shaft section speed isolines in the grading cavity are dense, a change gradient is great, particle dispersion is facilitated, and a stable grading flow fluid is formed in a radial direction of the grading cavity.

In conjunction with FIG. 1, FIG. 6, FIG. 7, FIG. 9 and FIG. 11*a*, a material guide hopper III03 is connected onto fixing plates III04 through material guide hopper fastening bolts III31 and material guide hopper fastening nuts III32. The four fixing plates III04 are disposed along the circumference of a same-cavity integrated vertical pulverizing barrel III05, and the two adjacent fixing plates form a 90° angle. The same-cavity integrated vertical pulverizing barrel III05 is connected onto the horizontal chassis seat II01 through bolts.

Figure 7:
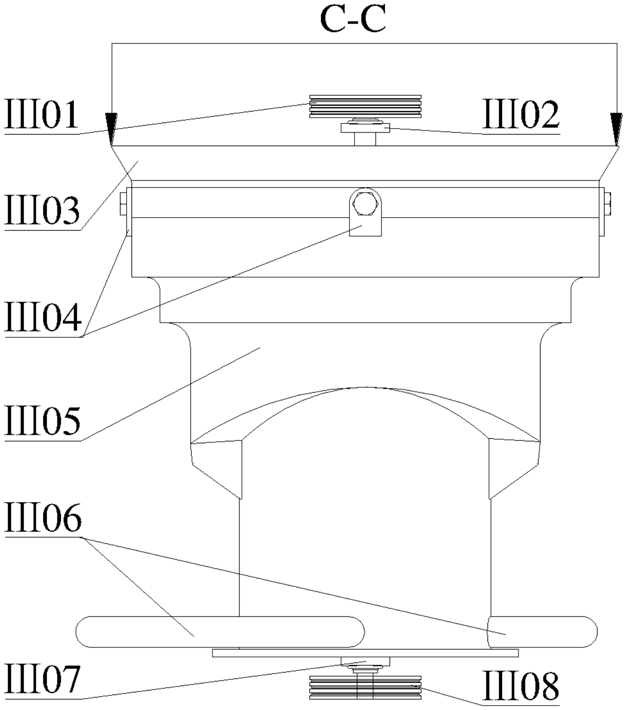
FIG. 7 is a left view of a same-cavity integrated vertical pulverizing device.

Specifically, in FIG. 7, a first bearing III02 is disposed at one side of the material guide hopper, an upper belt pulley III01 is disposed on the first bearing III02, a lower end of the same-cavity integrated vertical pulverizing barrel III05 is connected with a lower airflow pipeline III06, and the bottom of the same-cavity integrated vertical pulverizing barrel III05 is connected with a lower belt pulley III08 through a fourth bearing III07.

Figure 8:
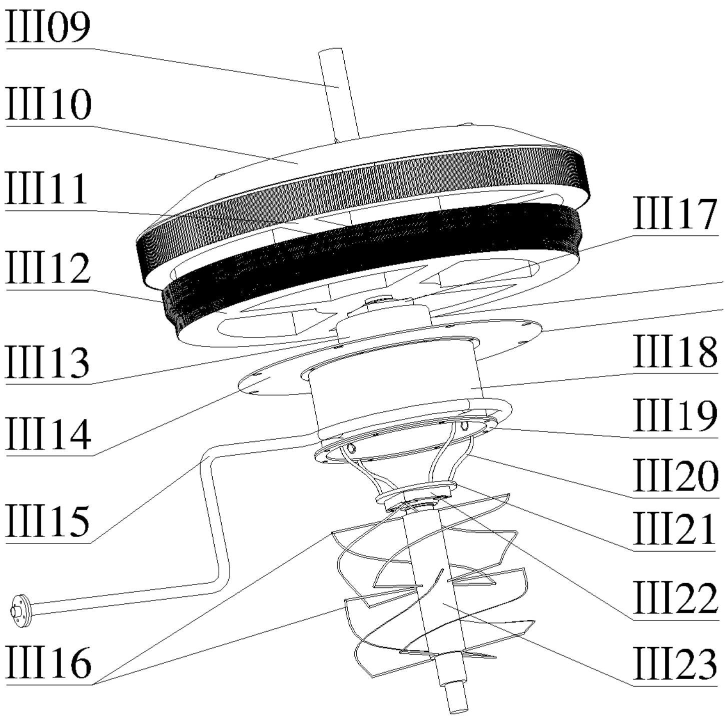
FIG. 8 is an axonometric assembly diagram of an inside structure of the same-cavity integrated vertical pulverizing device.

In conjunction with FIG. 8 an inside structure of the same-cavity integrated vertical pulverizing device III and FIG. 9 an integral sectional view of the same-cavity integrated vertical pulverizing device III, the material lifting disc III10 is fixed onto an upper main shaft III09 through a stop bolt, an upper rotor III11 is in keyed joint with the upper main shaft III09, an upper stator III25 is fixed onto the same-cavity integrated vertical pulverizing barrel III05 through a fastening bolt, and a material guide retainer ring III24 is pressed on an upper portion of the upper stator III25. A lower rotor III12 is in keyed joint with the upper main shaft III09, and a lower stator III27 is fixed onto the same-cavity integrated vertical pulverizing barrel III05 through a fastening bolt. A sleeve III26 is disposed between the upper rotor III11 and the lower rotor III12 to achieve a stop effect. A negative pressure material attraction cavity I113 is fixed onto a connecting disc III14 through bolts. The connecting disc III14 is fixed onto the same-cavity integrated vertical pulverizing barrel III05 through bolts. An upper airflow pipeline III15 is connected with the spray nozzles through bolts. The upper end of a superfine pulverizing barrel III18 is fixed onto the connecting disc III14 through a bolt, an upper end of a connecting grating plate III20 is welded to a lower end of the superfine pulverizing barrel III18, and a lower end of the connecting grating plate III20 is welded onto a lower connecting disc III21. A third bearing III22 is fixed onto the lower connecting disc III21 through a bolt. A lower main shaft III23 and a third bearing III22 are in interference fit. Spiral crushing gratings III16 are welded onto the lower main shaft III23 In conjunction with FIG. 23*n*, arc grading blades III28 are welded onto a grading blade connecting disc III58.

Figure 10A:
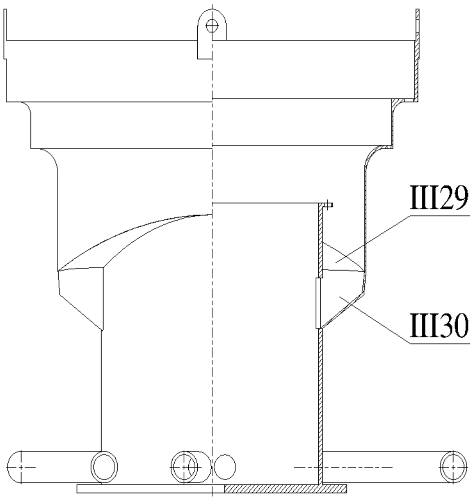
FIG. 10(*a*) is a semi-sectional view of a barrel of the same-cavity integrated vertical pulverizing device.
Figure 10B:
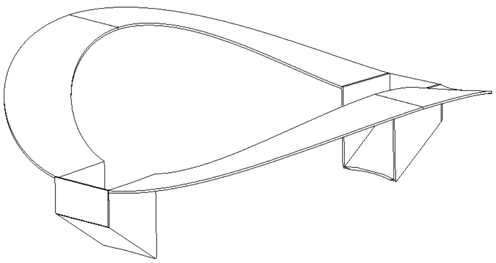

As shown in FIG. 10(*a*) and FIG. 10(*b*), a spiral material guide inner chute III29 and a feeding hopper III30 are welded into a whole. In conjunction with FIG. 7, the whole is welded onto the same-cavity integrated vertical pulverizing barrel III05, and materials falling along the circumference of the second-stage fine crushing region B are ensured to effectively slide into the third-stage pneumatic impact micro pulverizing region C.

Figure 11A:
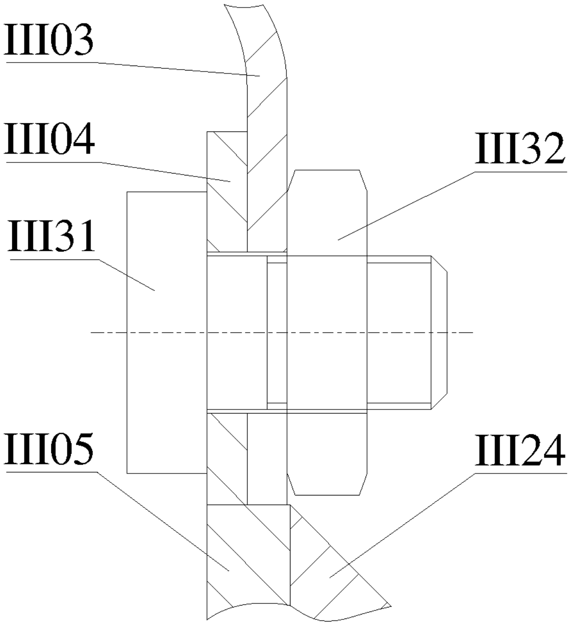
FIG. 11*a* is a sectional view of a partial enlargement structure of a position a in FIG. 8.

As shown in FIG. 11*a*, the material guide hopper III03 is connected onto the fixing plates III04 through the material guide hopper fastening bolts III31 and the material guide hopper fastening nuts III32, the four fixing plates III04 are disposed along the circumference of the same-cavity integrated vertical pulverizing barrel III05, and the material guide retainer ring III24 and the same-cavity integrated vertical pulverizing barrel III05 are in seamless attaching arrangement.

Figure 12B:
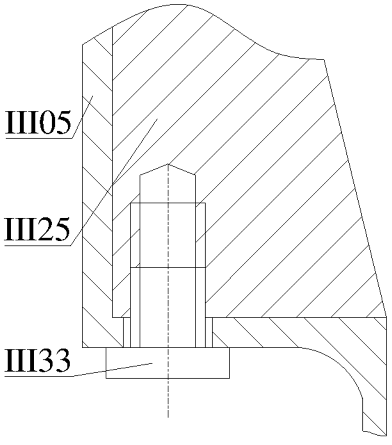
FIG. 12*b* is a sectional view of a partial enlargement structure of a position b in FIG. 8.

As shown in FIG. 12*b*, the upper stator III25 is fixed onto the same-cavity integrated vertical pulverizing barrel III05 through an upper stator fixing bolt III33.

Figure 13C:
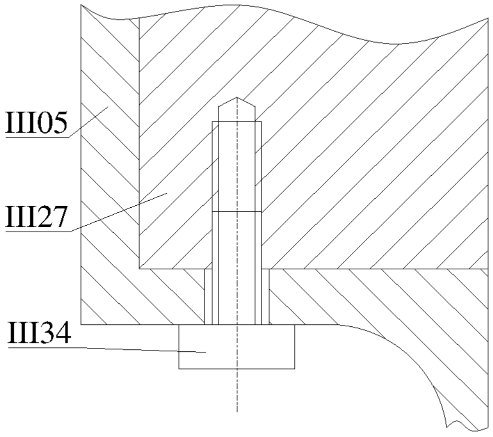
FIG. 13*c* is a sectional view of a partial enlargement structure of a position c in FIG. 8.

As shown in FIG. 13*c*, the lower stator III27 is fixed onto the same-cavity integrated vertical pulverizing barrel III05 through a lower stator fixing bolt III34.

Figure 14D:
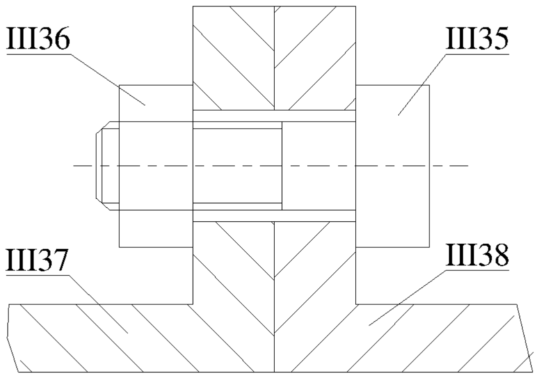
FIG. 14*d* is a sectional view of a partial enlargement structure of a position din FIG. 8.

As shown in FIG. 14*d*, a dismountable airflow pipe III37 and an upper airflow pipeline III38 are fixed together through dismountable airflow pipe fastening bolts I1135 and dismountable airflow pipe fastening nuts III36.

Figure 15E:
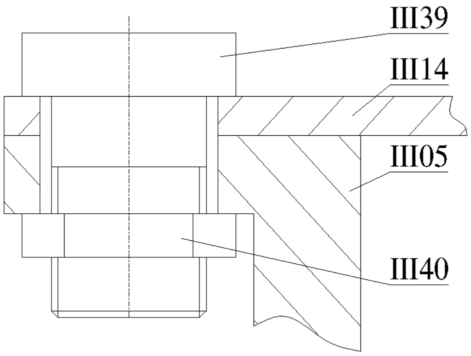
FIG. 15*e* is a sectional view of a partial enlargement structure of a position e in FIG. 8.

As shown in FIG. 15*e*, the connecting disc III14 is connected to the same-cavity integrated vertical pulverizing barrel III05 through a connecting disc fastening bolt III39 and a connecting disc fastening nut III40.

Figure 16F:
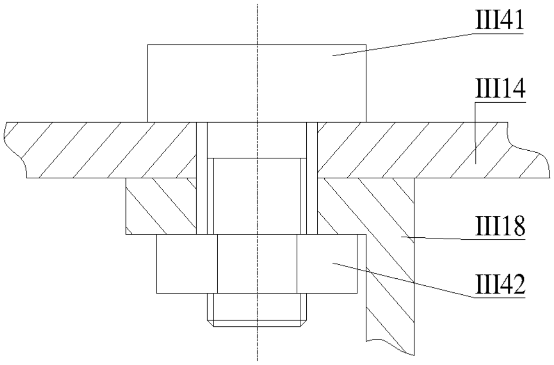
FIG. 16*f* is a sectional view of a partial enlargement structure of a position fin FIG. 8.

As shown in FIG. 16*f*, the connecting disc III14 and the superfine pulverizing barrel III18 are fixedly connected through superfine pulverizing barrel fastening bolts III41 and superfine pulverizing barrel fastening nuts III42.

Figure 17G:
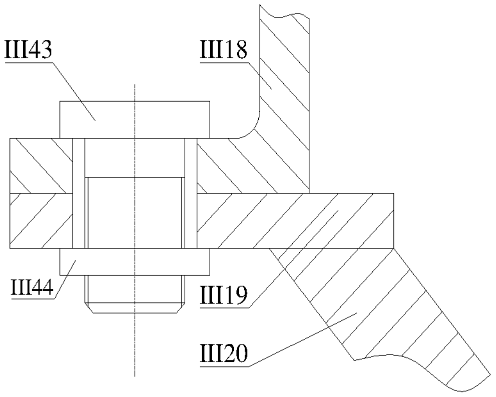
FIG. 17*g* is a sectional view of a partial enlargement structure of a position gin FIG. 8.

As shown in FIG. 17*g*, the superfine pulverizing barrel III18 and the connecting grating plate III20 are both connected to an upper connecting ring III19, and the superfine pulverizing barrel III18 and the upper connecting ring III19 are fixedly connected through grading blade fastening bolts III43 and grading blade fastening nuts III44.

Figure 18H:
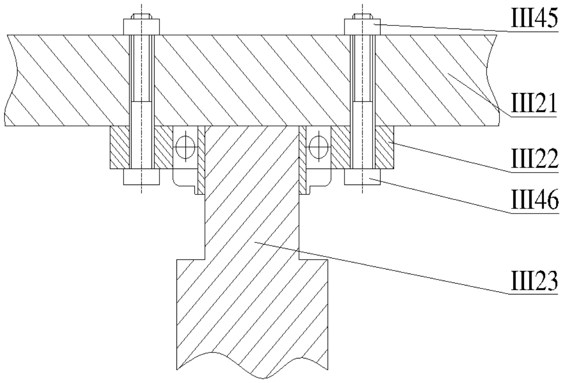
FIG. 18*h* is a sectional view of a partial enlargement structure of a position h in FIG. 8.

As shown in FIG. 18*h*, the lower connecting disc III21 is connected to the lower main shaft III23 through the third bearing III22, and the lower connecting disc III21 and the third bearing III22 are fixedly connected through a third bearing seat fastening nut III45 and a third bearing seat fastening bolt III46.

Figure 19I:
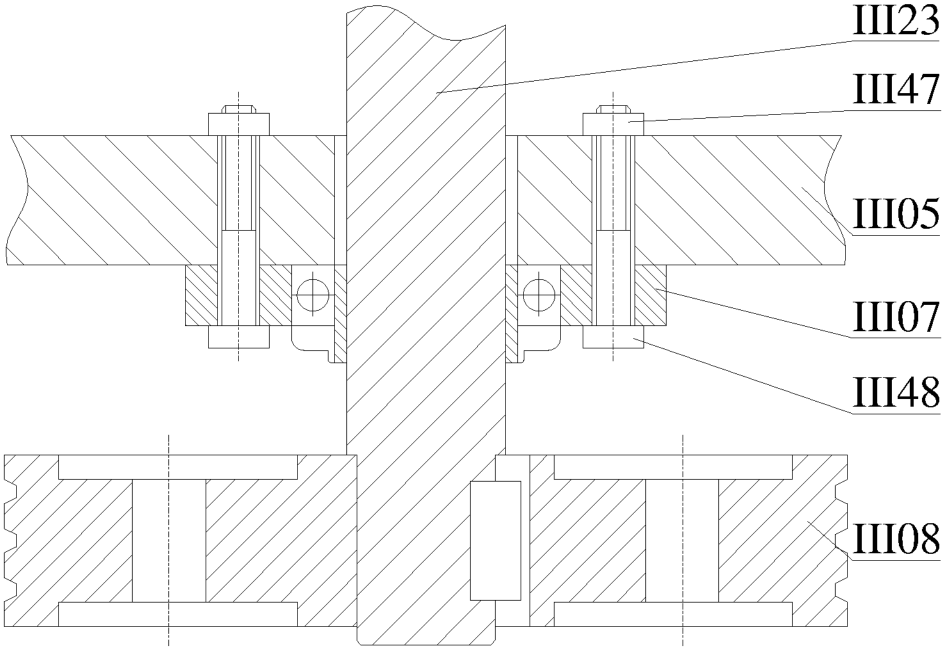
FIG. 19*i* is a sectional view of a partial enlargement structure of a position i in FIG. 8.

As shown in FIG. 19*i*, the lower main shaft III23 sequentially passes through the same-cavity integrated vertical pulverizing barrel III05, a fourth bearing III07 and the lower belt pulley III08, and the same-cavity integrated vertical pulverizing barrel III05 and the fourth bearing III07 are fixedly connected through a fourth bearing seat fastening nut III47 and a fourth bearing seat fastening bolt III48.

Figure 20J:
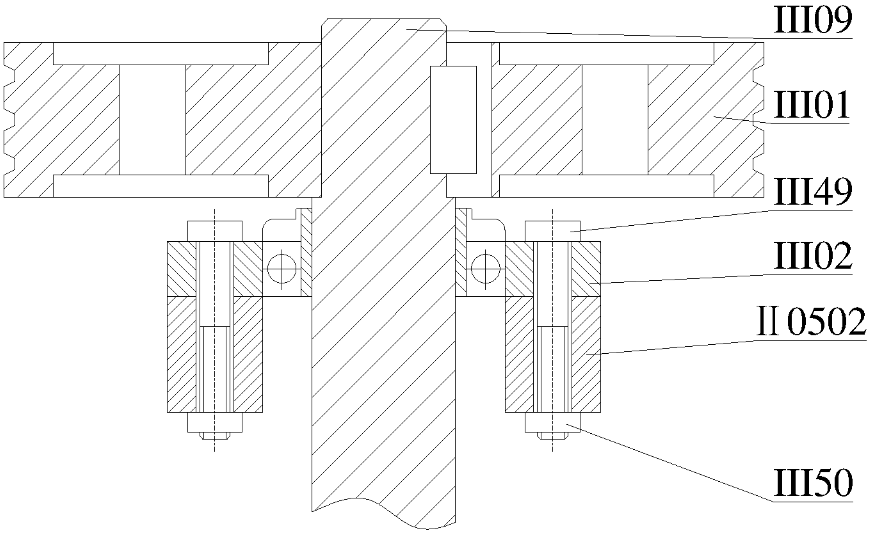
FIG. 20*j* is a sectional view of a partial enlargement structure of a position j in FIG. 8.

As shown in FIG. 20*j*, the upper main shaft III09 sequentially passes through the first bearing III02 and the upper belt pulley III01, the first bearing III02 is fixedly connected onto the second support plate 110502 through a first bearing seat fastening bolt III49 and a first bearing seat fastening nut III50.

Figure 21K:
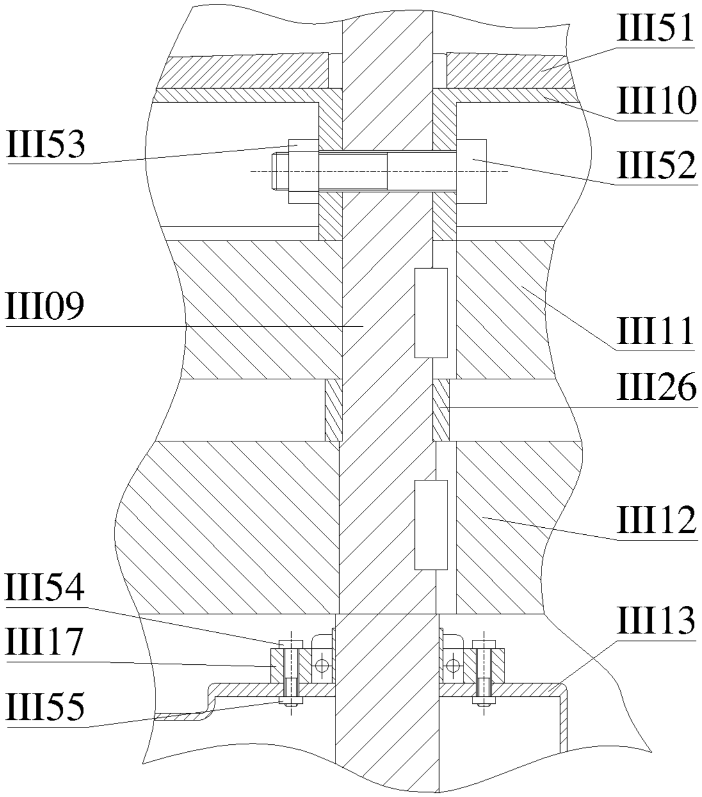
FIG. 21*k* is a sectional view of a partial enlargement structure of a position kin FIG. 8.

As shown in FIG. 21*k*, material shifting teeth III51 are welded onto the material lifting disc III10, and the material lifting disc III10 is fixed onto the upper main shaft III09 through an upper stop bolt III52 and an upper stop nut III53. The upper rotor III11 is in keyed joint with the upper main shaft III09, the lower rotor III12 is in keyed joint with the upper main shaft III09. The sleeve III26 is disposed between the upper rotor III11 and the lower rotor III12, and achieves a stop effect. A second bearing III17 is fixed onto the negative pressure material attraction cavity III13 through a second bearing seat fastening bolt III54 and a second bearing seat fastening nut III55.

Figure 22M:
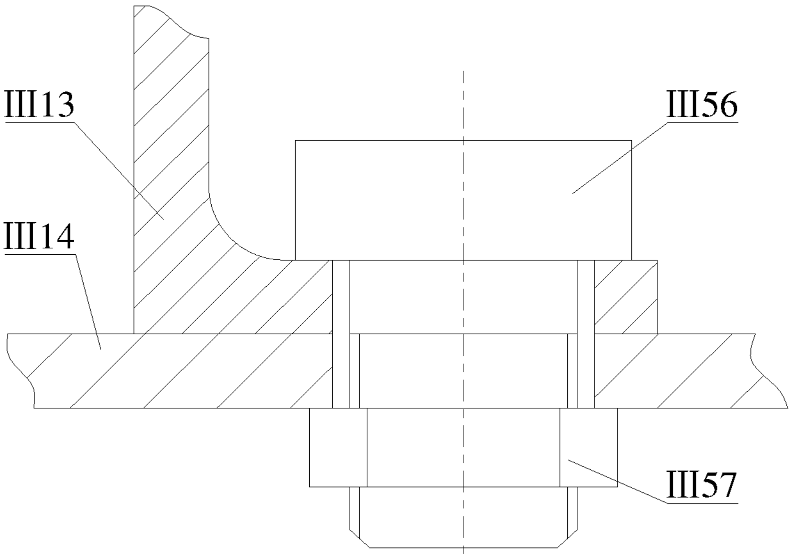
FIG. 22*m* is a sectional view of a partial enlargement structure of a position m in FIG. 8.

As shown in FIG. 22*m*, the negative pressure material attraction cavity III13 and the connecting disc III14 are fixedly connected through a negative pressure material attraction cavity fastening bolt III56 and a negative pressure material attraction cavity fastening nut 11157.

Figure 23N:
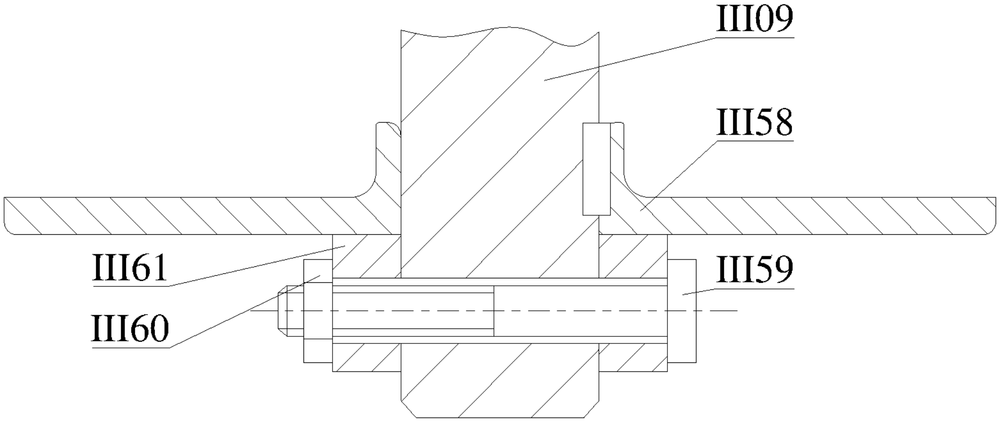
FIG. 23*n* is a sectional view of a partial enlargement structure of a position n in FIG. 8.

As shown in FIG. 23*n*, the upper main shaft III09 passes through the grading blade connecting disc III58 and a stop sleeve III61, and the upper main shaft III09 and the stop sleeve III61 are fixedly connected through a lower stop bolt III59 and a lower stop nut 11160.

Description is made according to a sequence from top to bottom of a structure.

Figure 29:
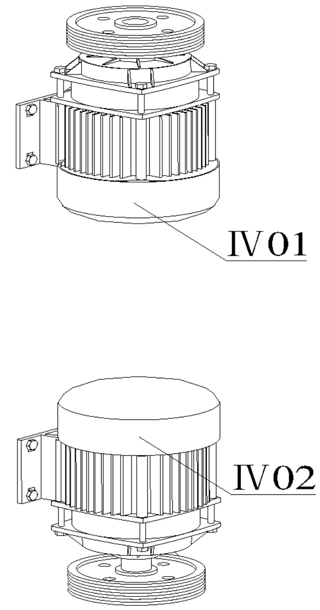
FIG. 29 is an axonometric diagram of a power source.

In conjunction with FIG. 20*j* and FIG. 29, the first bearing III02 is fixed onto the second support plate 110502 (or the first support plate 110501) through the first bearing seat fastening bolt III49 and the first bearing seat fastening nut III50, and the upper belt pulley III01 is in keyed joint with the upper main shaft III09. The upper belt pulley III01 is connected with the first motor IV01 through a belt, and a rotating speed of the first motor IV01 is 2000 r/min.

In conjunction with FIG. 21*k*, the material lifting disc III10 sleeves the upper main shaft III09 and synchronously rotates at a high speed along with the upper main shaft. Falling walnut shells can be uniformly lifted into the wedge-shaped gap of the first-stage coarse crushing region through the material shifting teeth III51 on the top. The material lifting disc III10 is fixed and limited by the upper stop bolt III52 and the upper stop nut III53. At the same time, the material lifting disc III10 can perform upper position limitation on the upper rotor III11.

In conjunction with FIG. 12*b*, the upper stator III25 is fixed onto the same-cavity integrated vertical pulverizing barrel III05 through the upper stator fixing bolts I1133 (four are disposed along the circumference of the upper stator III25, and the adjacent two form a 90° angle). An outer diameter of the material guide retainer ring III24 is the same as a diameter of the upper stator III25, and the material guide retainer ring is pressed on the top of the upper stator III25 to achieve a material guide effect. In conjunction with FIG. 21*k*, the upper rotor III11 is in keyed joint with the upper main shaft III09, and realizes lower position limitation through the sleeve III26.

In conjunction with FIG. 13*c*, the lower stator III27 is fixed onto the same-cavity integrated vertical pulverizing barrel III05 through lower stator fixing bolts III34 (four are disposed along the circumference of the lower stator III27, and the adjacent two form a 90° angle). In conjunction with FIG. 21*k*, the lower rotor III12 is in keyed joint with the upper main shaft III09, and realizes upper positioning through the sleeve III26 and lower positioning through a shaft shoulder of the upper main shaft III09.

Figure 28A:
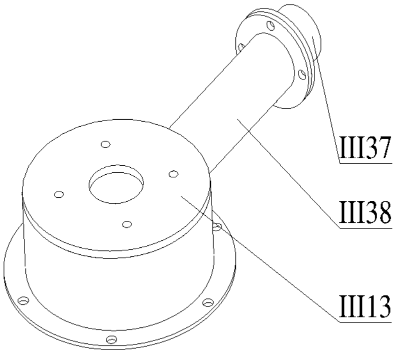
FIG. 28(*a*) is an axonometric diagram of a negative pressure material attraction cavity.
Figure 28B:
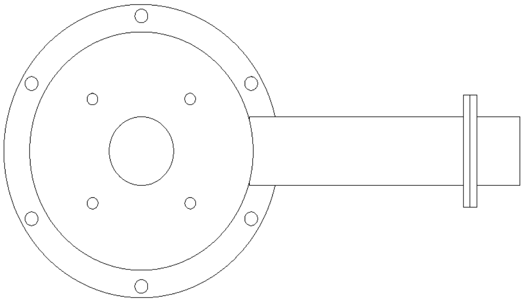

In conjunction with FIG. 14*d*, FIG. 22*m*, FIG. 28(*a*) and FIG. 28(*b*), the negative pressure material attraction cavity III13 is fixed onto the connecting disc III14 through the negative pressure material attraction cavity fastening bolts III56 and the negative pressure material attraction cavity fastening nuts III57 (six are disposed along the circumference of the negative pressure material attraction cavity I1113, and the adjacent two form a 60° angle). A dismountable airflow pipe III37 is fixed onto the upper airflow pipeline I1138 through the dismountable airflow pipe fastening bolts I1135 and the dismountable airflow pipe fastening nuts I1136 (four are disposed along the circumference of the dismountable airflow pipe III37, and the adjacent two form a 90° angle).

In conjunction with FIG. 15*e*, the connecting disc III14 is fixed onto the same-cavity integrated vertical pulverizing barrel III05 through the connecting disc fastening bolts III39 and the connecting disc fastening nuts III40 (eight are disposed along the circumference of the connecting disc III14, and the adjacent two form a 45° angle).

In conjunction with FIG. 16*f*, the superfine pulverizing barrel III18 is fixed onto the connecting disc III14 through the superfine pulverizing barrel fastening bolts III41 and the superfine pulverizing barrel fastening nuts III42 (eight are disposed along the circumference of the superfine pulverizing barrel III18, and the adjacent two form a 45° angle).

In conjunction with FIG. 23*n*, the grading blade connecting disc III58 is in keyed joint with the upper main shaft III09, and synchronously rotates at a high speed along with the upper main shaft. Through the grading blades, nearby walnut shell superfine particles generate certain centrifugal force. Superfine particles meeting the particle size requirement are attracted out through negative pressure attraction greater than centrifugal force to be collected, big particles which do not meet the particle size requirements fall down since the received negative pressure attraction is smaller than the centrifugal force, and grading is realized. The stop sleeve III61 performs lower positioning on the grading blade connecting disc III58. The stop sleeve III61 is fixed onto the upper main shaft III09 through the lower stop bolt III59 and the lower stop nut III60.

In conjunction with FIG. 17*g*, the upper connecting ring III19 is fixed onto the superfine pulverizing barrel III18 through upper connecting ring fastening bolts III43 and upper connecting ring fastening nuts III44 (six are disposed along the circumference of the upper connecting ring III19, and the adjacent two form a 60° angle). The connecting grating plates III20 (four are disposed along the circumference of the upper connecting ring III19, and the adjacent two form a 90° angle) are respectively welded onto the upper connecting ring III19 and the lower connecting disc III21.

In conjunction with FIG. 18*h*, the third bearing III22 is fixed onto the lower connecting disc III21 through the third bearing seat fastening nut III45 and the third bearing seat fastening bolt III46. The lower main shaft III23 and the third bearing III22 are in interference fit. The lower connecting disc III21 achieves a position limitation effect on the lower main shaft III23.

In conjunction with FIG. 19*i* and FIG. 29, the fourth bearing III07 is fixed onto the same-cavity integrated vertical pulverizing barrel III05 through the fourth bearing seat fastening nut III47 and the fourth bearing seat fastening bolt III48. The lower main shaft 11123 and the fourth bearing III07 are in interference fit. The lower main shaft III23 is in keyed joint with the lower belt pulley III08. The lower belt pulley III08 is connected with the second motor IV02 through a belt, and a rotating speed of the second motor IV02 is 1500 r/min.

Figure 24:
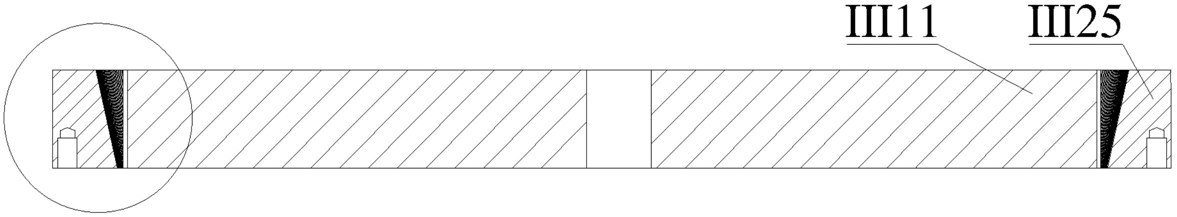
FIG. 24 is a sectional view of a first-stage coarse crushing region of the same-cavity integrated vertical pulverizing device.
Figure 24A:
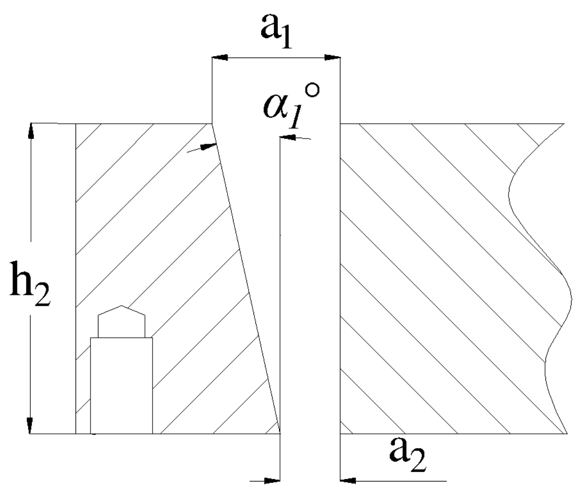
Figure 24B:
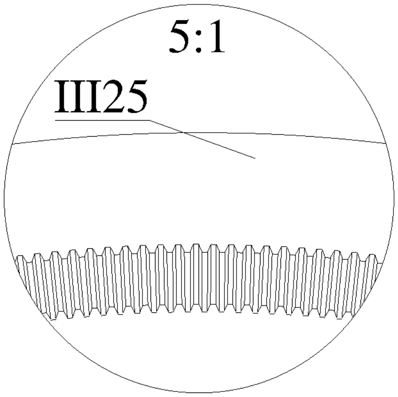
Figure 24C:
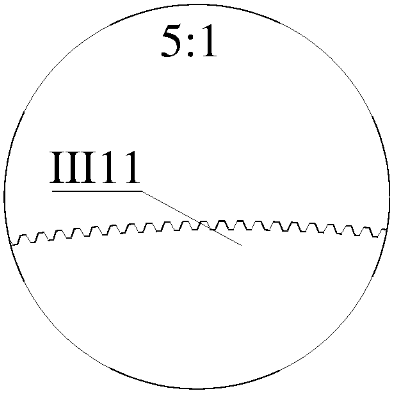
Figure 24D:
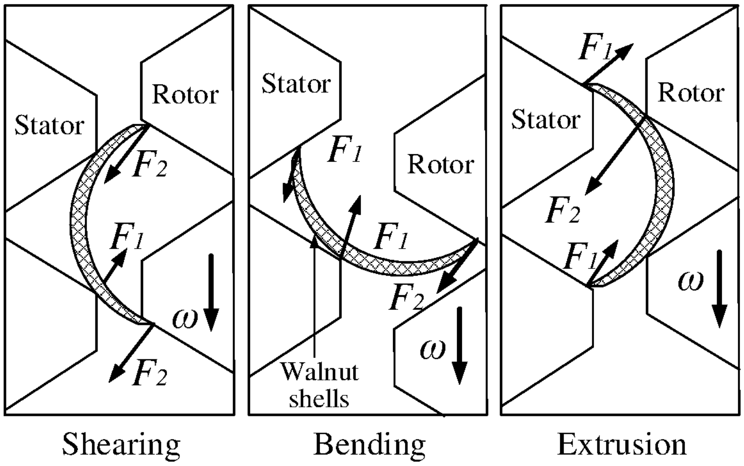
Figure 24E:
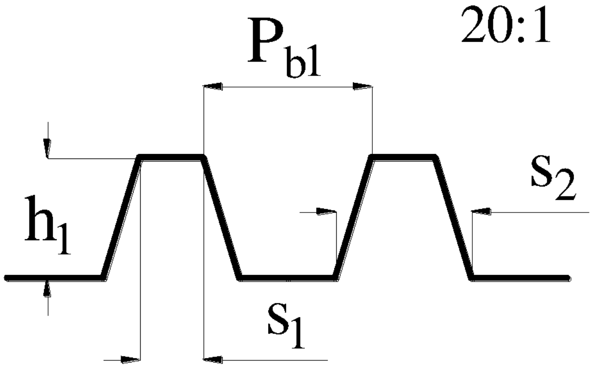

FIG. 24 to FIG. 24(*e*) show detailed diagrams of the first-stage coarse crushing region A.

In conjunction with FIG. 24 and FIG. 24(*a*), the first-stage coarse crushing region A uses a wedge-shaped crushing gap, and a goal is to enable the particle size of the coarsely pulverized walnut shells to meet the second-stage fine pulverization particle size requirement. The walnut shell falling speed is decreased, so that the walnut shells can be sufficiently crushed. After a great number of walnut shells are broken to remove kernels, the size of the walnut shells is generally 10-40 mm. In order that the big-size walnut shells can effectively enter the wedge-shaped gap, an inlet size of the present embodiment can be set as $a_1$=40 mm. According to the particle size requirement of finely pulverized raw materials in Table 1, an outlet size of the present embodiment can be set as $a_2$=15 mm. In order to realize uniform crushing, a height of the crushing region of the present embodiment can be set as $h_2$=100 mm. A slope inclination angle of the upper stator III25 can be obtained through $\tan \alpha=(a_1-a_2)/h_2$, and $\alpha_1\approx 15°$.

In conjunction with FIG. 24(*b*) and FIG. 24(*c*), the tooth types of the upper rotor III11 and the upper stator III25 are both fine-pitch longitudinal trapezoidal teeth. Since the walnut shell materials downwards slide from the wedge-shaped gap, by using the longitudinal trapezoidal teeth, the upper rotor III11 can favorably achieve an impact crushing effect on the walnut shells.

In conjunction with FIG. 24(*d*) and FIG. 24(*e*), after the walnut shells are broken to remove kernels, most walnut shells are semispherical or ellipsoidal shells with a certain radian, and a small number of walnut shells are small-particle-size approximately planar shells (directly sliding to a next stage of crushing region). By aiming at the walnut shells with the radian, according to different pose distribution states of the walnut shells between the longitudinal trapezoidal teeth, the stress forms are mainly shearing, bending and extrusion. Sharp ends of the trapezoidal teeth can greatly enhance the stress concentration condition of the stress point of the walnut shells. Under the high-speed rotation of the upper rotor III11, the stress of the stress point of the walnut shell is much greater than a fracture limit, so that fracture instantaneously occurs. The crushed shells continuously fall down, and the above process is repeated. In order to sufficiently crush the walnut shells in the wedge-shaped gap and prevent the shells from being clamped in a tooth gap, the tooth gap and the tooth height should be much smaller than an outlet size $a_2$. According to the present embodiment, $P_{b1}$=6-8 mm, and $h_1$=6 mm can be set, and upper and lower tooth widths can be set as $s_1$=5 mm, and $s_2$=8 mm.

Through the first-stage coarse crushing region A, the size of the walnut shell particles can be controlled at 15 mm or smaller.

Figure 25:
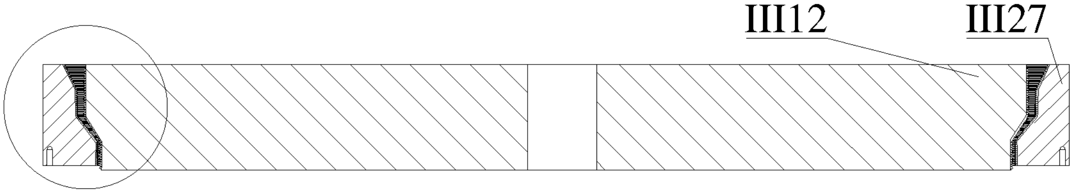
FIG. 25 is a sectional view of a second-stage coarse crushing region of the same-cavity integrated vertical pulverizing device.
Figure 25A:
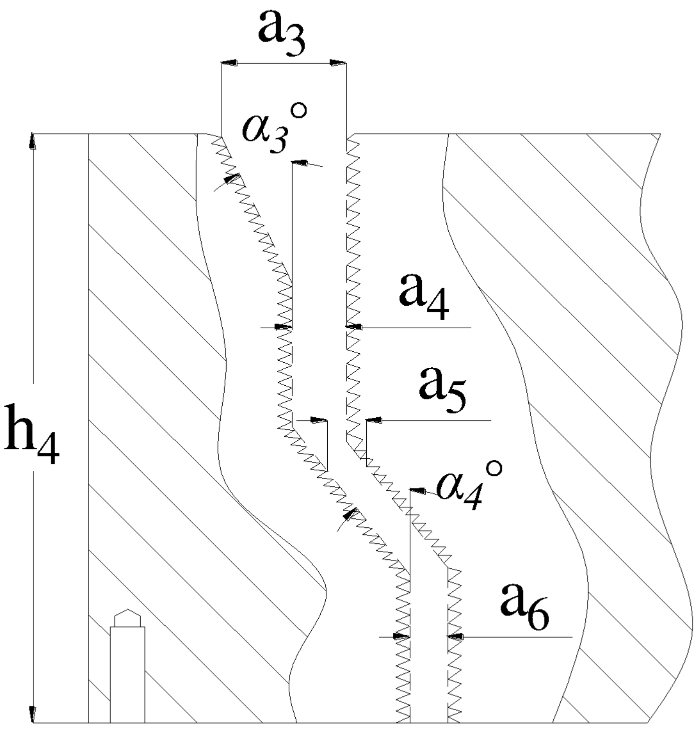
Figure 25B:
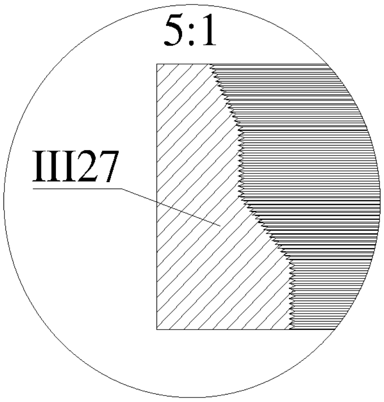
Figure 25C:
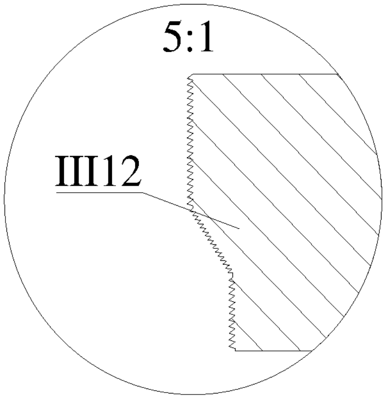
Figure 25D:
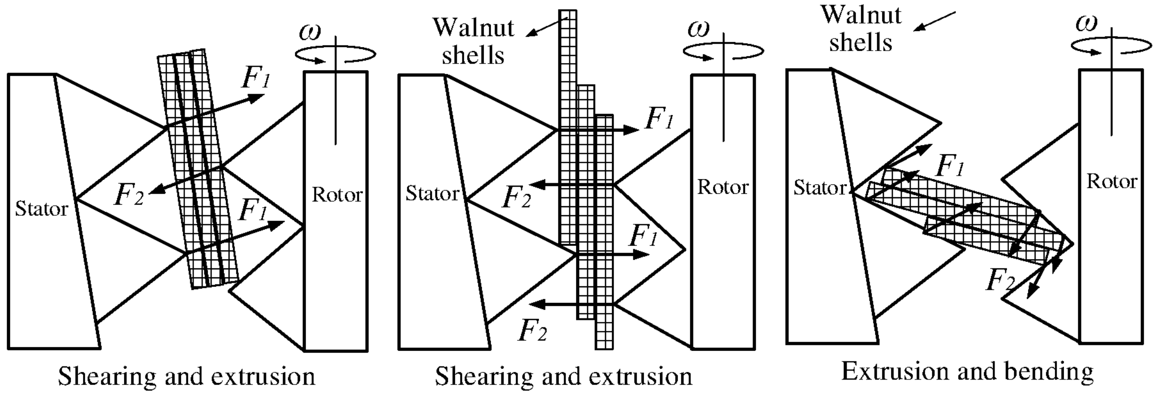
Figure 25E:
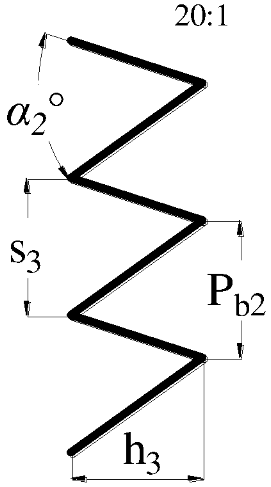

FIG. 25 to FIG. 25(*d*) show detailed diagrams of the second-stage fine crushing region B.

In conjunction with FIG. 25 and FIG. 25(*a*), the second-stage fine crushing region B uses a two-stage wedge-shaped direct-through gradually reducing gap. The goal is to enable the particle size of the finely pulverized walnut shells to reach the third-stage pneumatic impact micro pulverization particle size requirement. The gap gradual reduction aims at further reducing the particle size, the direct-through gap aims at sufficiently and uniformly crushing a great number of walnut shells and preventing the blockage along with the reduction of the wedge-shaped gap. In order to enable the coarsely crushed walnut shells to effectively enter the upper wedge-shaped gap, an inlet size can be set as $a_3$=20 mm. In order to realize the sufficient and uniform crushing of the walnut shells in the upper direct-through gap, an outlet of the upper wedge-shaped gap shall not be too small, blockage caused by entering incapability of particles with great particle sizes is prevented, and an outlet size can be set as $a_4$=10 mm. Through the sufficient crushing by the upper direct-through gap, the size of the walnut shell particles entering the lower wedge-shaped gap is basically smaller than 10 mm. The lower edge-shaped gap inlet is $a_4$, the gap $a_5$ towards the lower side is gradually reduced, and the lower wedge-shaped gap outlet (the lower direct-through gap inlet) can be set as $a_6$=5 mm. In order to realize uniform crushing, a height of the crushing region of the present embodiment can be set as $h_4$=160 mm, a vertical height of each layer of the two-stage wedge-shaped direct-through gradually reducing gap is 40 mm, an upper wedge-shaped angle is $\alpha_3$=15°, and a lower wedge-shaped angle is $\alpha_3$=30°.

In conjunction with FIG. 24(*b*) and FIG. 24(*c*), the tooth types of the lower rotor III12 and the lower stator III27 are both fine-pitch transverse sharp patterned teeth. The transverse sharp patterned teeth of a wedge-shaped portion of the lower stator III27 are in step type downward distribution, and the falling speed of the walnut shells is favorably decreased, so that the walnut shells are sufficiently crushed.

In conjunction with FIG. 24(*d*) and FIG. 24(*e*), after coarse crushing, most walnut shells are flat-shaped flakes with a size smaller than 15 mm, and the radian is very small. When a great number of walnut shell flakes pass through the gap of the second-stage fine crushing region, stacking structures are easily formed, and according to different pose distribution states among the transverse sharp patterned teeth, the stress forms are mainly shearing, extrusion and bending. Along with the gap reduction, the size of the walnut shell particles is decreasing. Under the high-speed rotation effect of the lower rotor III12, compared with longitudinal patterned teeth, the fine-pitch transverse sharp patterned teeth can effectively act on the flake stacking structure to form a high-speed shearing effect, so that the walnut shell flakes fracture along the sharp patterned tooth acting point to be finely crushed, and particles in a smaller size are formed. The crushed shells continuously fall down, and the above process is repeated. In order to sufficiently crush the walnut shells in the wedge-shaped gap and prevent the shells from being clamped in the tooth gap, the tooth gap and the tooth height shall be smaller than the outlet size $a_6$. According to the present embodiment, $P_{b2}$=3 mm, and $h_3$=3 mm can be set, and the tooth width and the tooth angle of the present embodiment can be set as $s_3$=3 mm, and $\alpha_2$≈60°.

Through the second-stage fine crushing region B, the size of the walnut shell particles can be controlled at 5 mm or smaller.

Figure 26:
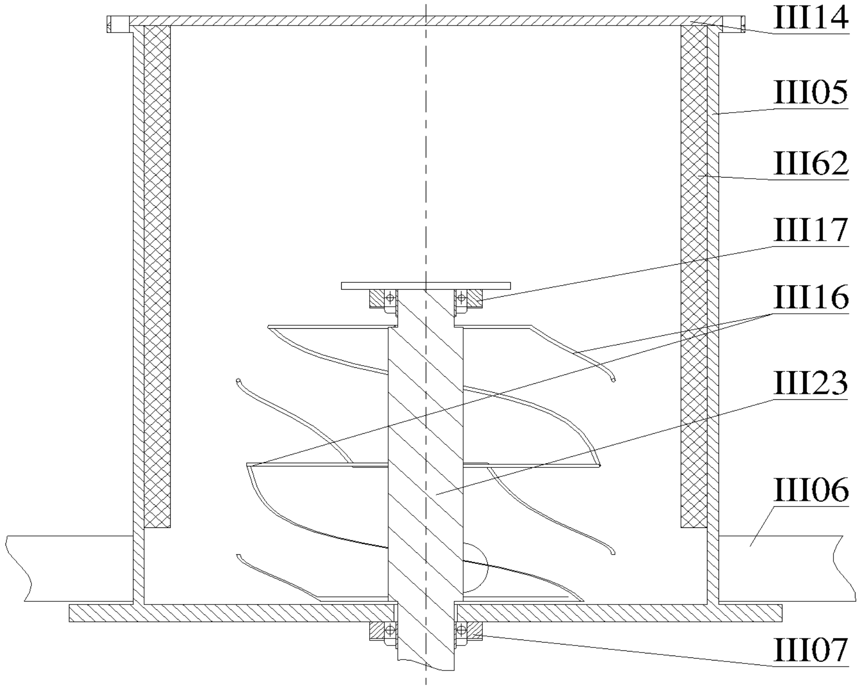
FIG. 26 is a sectional view of a third-stage pneumatic impact micro pulverizing region of the same-cavity integrated vertical pulverizing device.
Figure 26A:
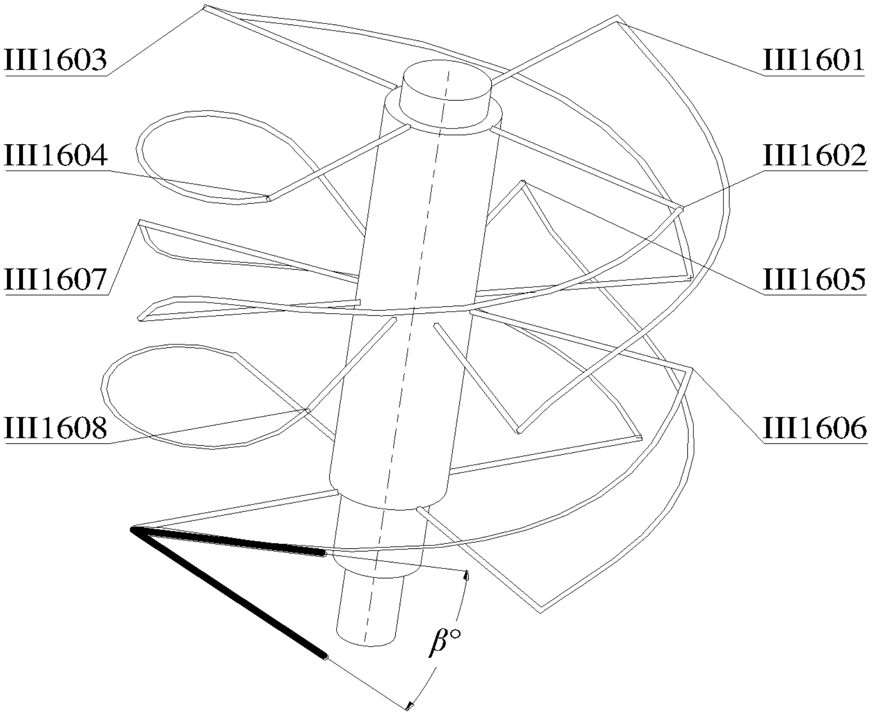
Figure 26B:
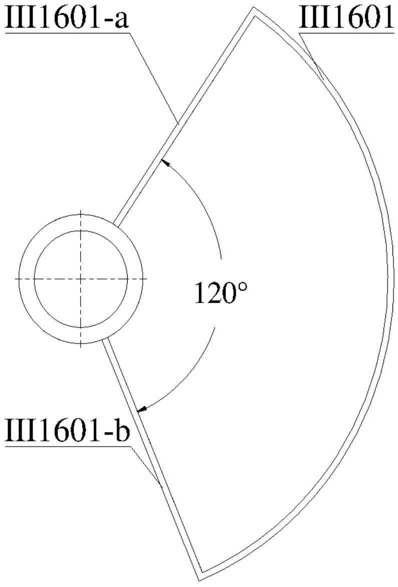
Figure 26C:
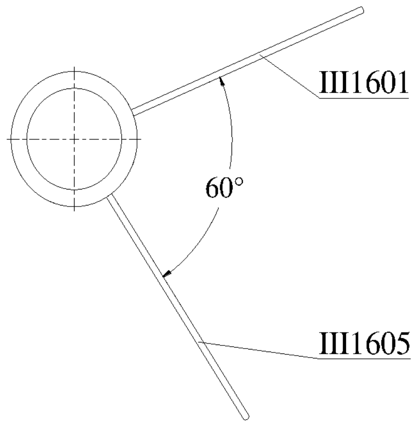
Figure 26D:
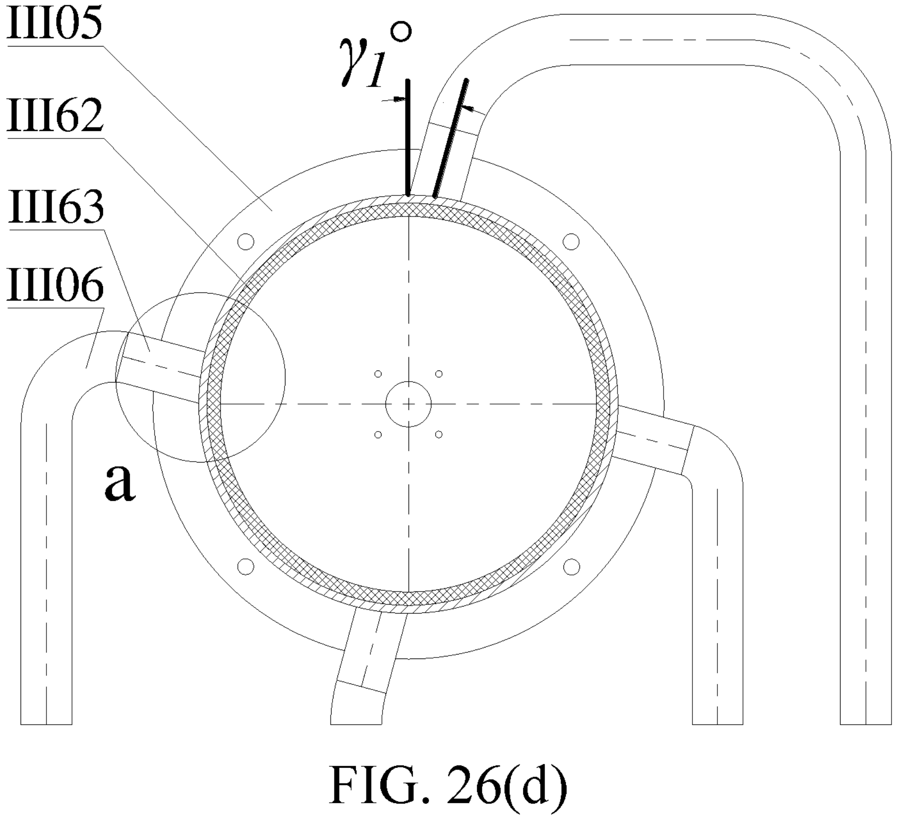
Figure 26E:
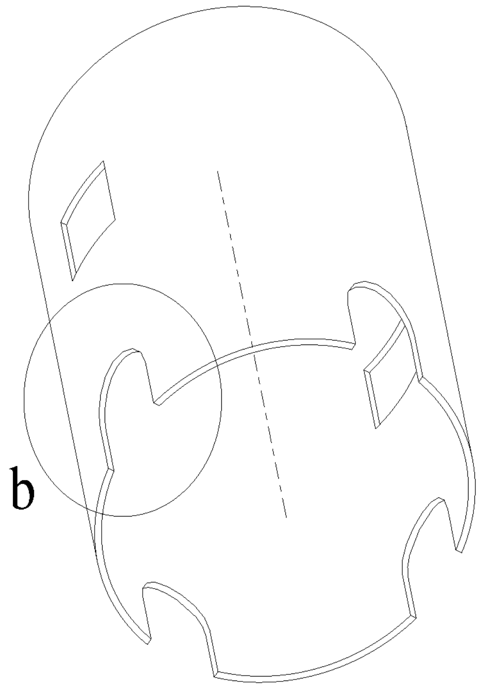
Figure 26F:
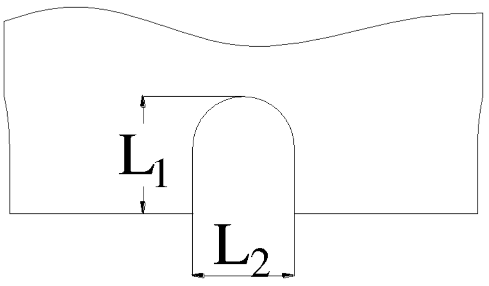
Figure 26G:
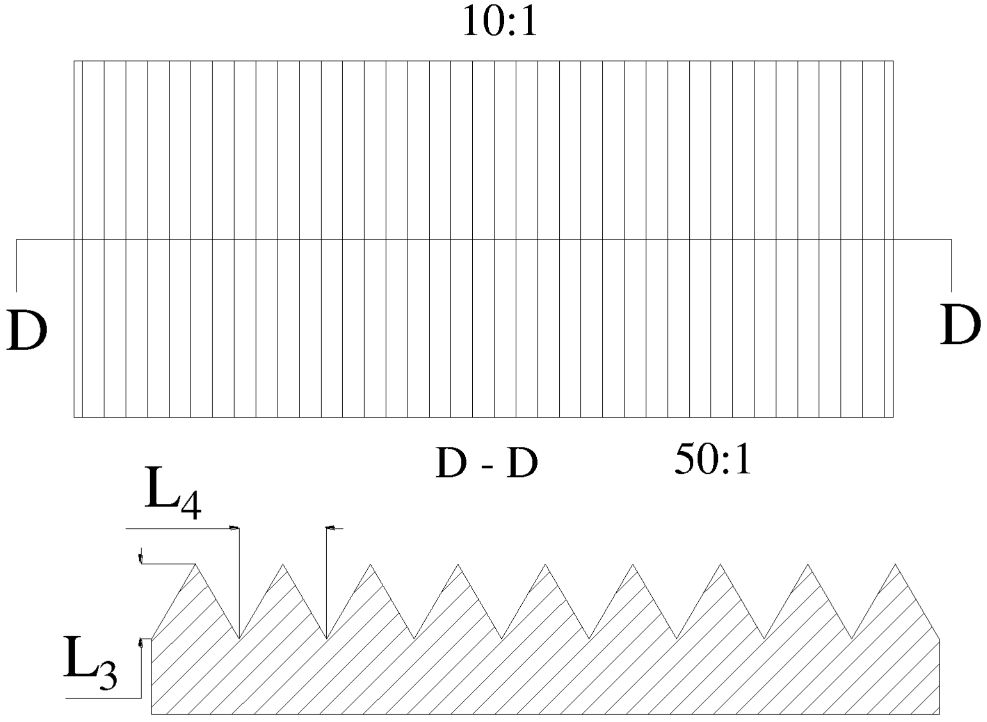
Figure 26H:
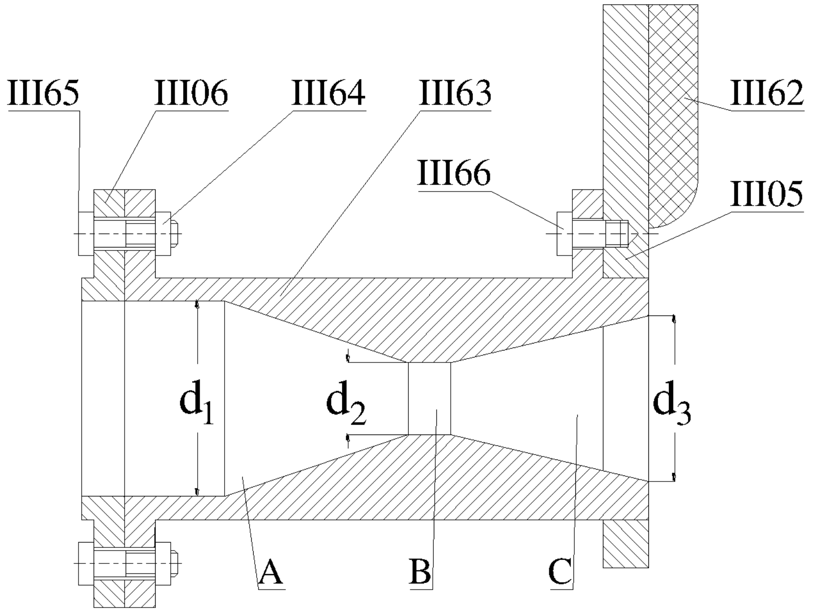

FIG. 26 to FIG. 26(*h*) show detailed diagrams of the third-stage pneumatic impact micro pulverizing region C.

In conjunction with FIG. 26, FIG. 26(*a*), FIG. 26(*b*) and FIG. 26(*c*), the upper end of the lower main shaft III23 and the second bearing III17 are in interference fit, the lower end and the fourth bearing III07 are in interference fit, and the position limitation on the lower main shaft III23 is realized. The spiral crushing gratings III16 includes a first upper crushing grating III1601, a second upper crushing grating III1602, a third upper crushing grating III1603, a fourth upper crushing grating III1604, a fifth lower crushing grating III1605, a sixth lower crushing grating III1606, a seventh lower crushing grating III1607 and an eighth lower crushing grating III1608 which are all welded onto the lower main shaft III23. A spiral angle of each of the crushing gratings is β=30°. The two adjacent crushing gratings at an upper portion are in 90° distribution, and the two adjacent crushing gratings at a lower portion are in 90° distribution.

By taking the first upper crushing grating III1601 as an example, an upper straight grating III1601-*a* and a lower straight grating III1601-*b* are in 120° distribution, and the rest crushing gratings are disposed in the same mode as the above. By taking the first upper crushing grating III1601 and the adjacent fifth lower crushing grating III1605 as an example, the upper straight grating III1601-*a* and the upper straight grating III1605-*c* are in 60° distribution, and the rest same combination of crushing gratings are disposed in the same mode as the above.

In conjunction with FIG. 26, FIG. 26(*d*), FIG. 26(*e*), FIG. 26(*f*), FIG. 26(*g*) and FIG. 26(*h*), a material of the inner lining layer III62 is a high-hardness wear-resistant material of high manganese steel, an outer diameter is the same as an inner diameter of the same-cavity integrated vertical pulverizing barrel III05, and the inner lining layer is sleeved inside the same-cavity integrated vertical pulverizing barrel III05. Windows (four are disposed at the circumference of the inner lining layer III62, and the adjacent two form a 90° angle) are formed in the lower end of the inner lining layer III62, a height is $L_1$, and a width is $L_2$. In order to enable the supersonic gas to effectively enter the pulverizing region C, the window size should be greater than a diameter of the spray nozzle outlets. According to the embodiment, $L_1$=2$d_3$, and $L_2$=1.5$d_3$ can be set. Tooth-shaped micro bulges are formed on the circumference of the inner barrel wall of the inner lining layer III62, and the walnut shell fine particles are carried by the high-speed airflow and are collided and violently rubbed with the micro bulges to achieve a pulverization effect. In order to prevent the fine particles from retaining in the tooth gap, the tooth height and the tooth gap shall be as small as possible. According to the present embodiment, the tooth height and the tooth gap can be set as $L_3$=1 mm, and $L_4$=1 mm.

The lower airflow pipelines III06 and the lower spray nozzles III63 are fixed through the lower spray nozzle fastening nuts III64 and the lower spray nozzle fastening bolts III65, so that the spray nozzles can be dismounted from the airflow pipelines. The lower spray nozzles III63 are fixed onto the same-cavity integrated vertical pulverizing barrel III05 through the lower spray nozzle fixing bolts III66, the spray nozzle outlets penetrate through the inner barrel wall, mounting or dismounting can be convenient, and the abrasion of the spray nozzles can be effectively prevented. Each of the lower spray nozzles III63 is a converging-diverging supersonic Laval spray nozzle, and is divided into three regions: a converging portion A, a throat portion B, and a diverging portion C, and additionally, $d_1>d_3>d_2$. By aiming at difficult-to-pulverize materials of the walnut shells, the present embodiment uses 0.6-1.0 MPa of the spray nozzle inlet pressure to improve the kinetic energy of the walnut shell particles at the spray nozzle outlets.

An arrangement angle between the lower spray nozzles III63 and the barrel diameter of the same-cavity integrated vertical pulverizing barrel III05 is $\gamma_1$, and in order to realize the greatest extent pulverization on the finely crushed walnut shells at the maximum collision speed, the arrangement angle needs to be analyzed and calculated.

The material particles bear the action of a plurality of following forces in a pulverization flow field:

inertial centrifugal force received by the particles:

$$F_C = \frac{\pi}{6} d^3 \rho_s \frac{u_t^2}{r_\rho}; \tag{1}$$

centripetal force received by the particles:

$$F_D = -\frac{\pi}{6} d^3 \rho_s \frac{u_t^2}{r_\rho}; \tag{2}$$

and fluid resistance received by the particles:

$$f = \zeta - \frac{\pi}{4} d^2 \rho \frac{u_r^2}{2}. \tag{3}$$

In the formulas, d represents a particle diameter, $\rho_s$ represents a material particle density, p represents an airflow density, $r_p$ represents a grading circle radius, $u_t$ represents a tangential speed of fluid, $u_r$ represents centripetal speed of the fluid, represents a resistance coefficient, and when $1<Re<10^3$, $\zeta=18.5/Re^{0.6}$, Re represents a Reynolds number, $Re=du_r\rho/\mu$, and $\mu$ represents a fluid viscosity.

Figure 30:
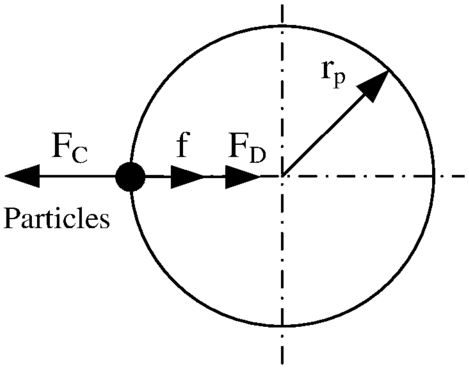
FIG. 30 is a schematic diagram of stress of walnut shell particles in an airflow field.

As shown in FIG. 30, $F_c$, $F_D$ and f will reach a balanced state in a certain grading circle, i.e.:

$$F_D+f-F_C=0 \tag{4}$$

The above formulas are sorted to obtain the particle diameter at a certain airflow speed:

$$d_p = \frac{3}{4}\zeta \frac{\rho}{(\rho s-\rho)} \cdot \frac{u_r^2}{u_t^2} \cdot r_\rho. \tag{5}$$

From Formula (5), it could be known that when an airflow medium and a pulverized material are certain, $\rho$ and $\rho_s$ are unchanged. Although the resistance coefficient $\zeta$ changes, the change is not great. Therefore, main factors influencing the particle size $d_p$ of the particles are only the tangential speed $u_t$ of the fluid, the centripetal speed $u_r$ of the fluid and a grading circle radius $r_p$. In a practical production process, the material particle density $\rho_s$ is certain, the airflow inlet intensity increase is often used to change $u_t$ so as to realize the particle size adjustment. However, the energy consumption will be increased in this mode. An ideal condition is to realize the pulverization operation by the maximum collision speed. Based on such design ideal, the maximum pulverization capability will be obtained. At this moment, the adjustment of the product particle diameter can only rely on $r_p$ change, the $r_p$ change is practically realized by changing the arrangement angle $\gamma_1$ of the spray nozzles, and this is the design idea of the arrangement angle of the spray nozzles. In order to realize low-energy-consumption (airflow amount reduction) pulverization, when the spray nozzle speed is the maximum, the arrangement angle adjustment is a unique feasible path for adjusting the product particle size. At this moment, only when the energy of a pulverizing machine unit is sufficiently used, the operation of pulverizing products with smaller particle sizes by a specific airflow pulverizing machine can be realized. Therefore, such an airflow pulverizing machine will better adapt to different operation work conditions.

Figure 31:
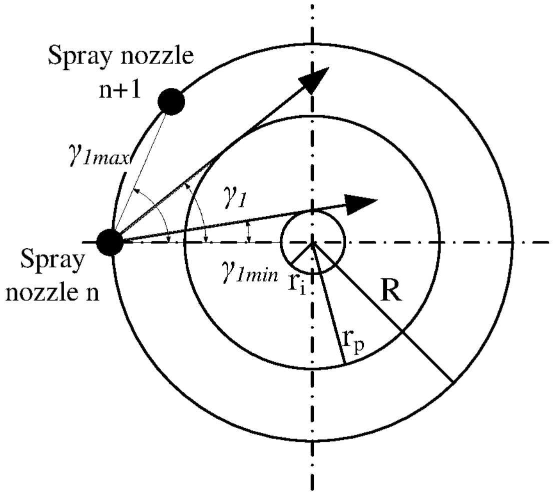
FIG. 31 is a schematic diagram of an arrangement angle of a spray nozzle.

As shown in FIG. 31, the arrangement angle of the spray nozzles and an adjusting range of the arrangement angle are as follows:

$$\gamma_1 = \mathrm{arc}tg\frac{r_\rho}{R}; \tag{6}$$

$$\gamma_{1max} = \frac{1}{2}\left(180 - \frac{360}{n}\right); \tag{7}$$

$$\gamma_{1min} = \mathrm{arc}tg\frac{r_i}{R}; \text{ and} \tag{8}$$

$$\Delta\gamma_1 = \gamma_{1max} - \gamma_{1min} = \left[\frac{1}{2}\left(180 - \frac{360}{n}\right) - \mathrm{arc}tg\frac{r_i}{R}\right]. \tag{9}$$

In the formulas, $\gamma_1$ represents an arrangement angle of lower spray nozzles, $r_p$ represents a grading circle radius (spiral crushing grating rotation radius), R represents a crushing chamber radius, and $r_i$ represents a lower main shaft radius.

According to the present embodiment, 4 lower spray nozzles are used, i.e., n=4, R=300 mm, $r_i$=30 mm, and $r_p$=150 mm. Through calculation by the above formula, $\Delta\gamma_1\approx28°$, i.e., an adjustable range of the arrangement angle of the lower spray nozzle is 28°. In order to enable the materials to effectively enter the rotating range of the crushing gratings to be pulverized, through calculation, $\gamma_1=20°$ can be taken.

Through the third-stage pneumatic impact micro pulverization region C, the size of the walnut shell particles can be controlled at 50 μm or smaller.

Figure 27:
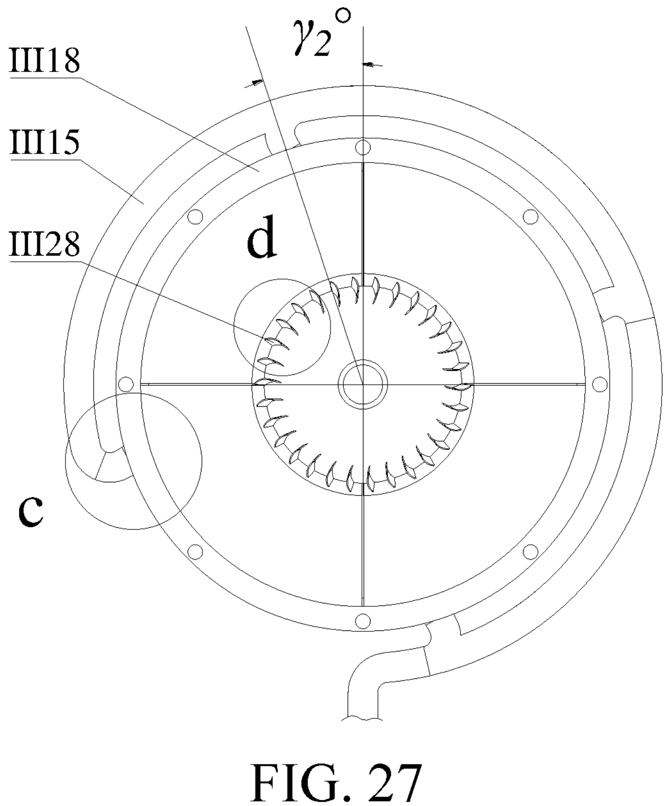
FIG. 27 is a schematic diagram of distribution of an upper airflow pipeline of a fourth-stage airflow mill superfine pulverizing region.
Figure 27A:
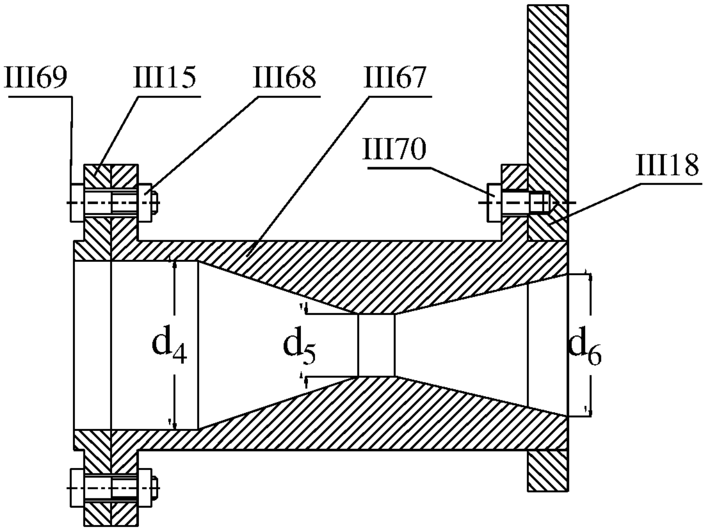
Figure 27B:
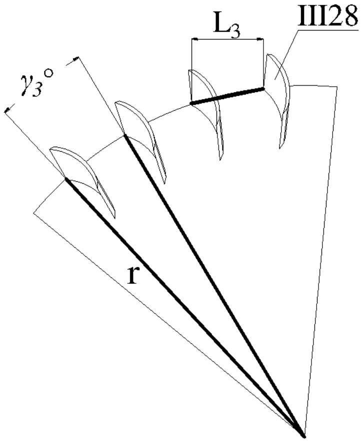

FIG. 27 to FIG. 27(*b*) show detailed diagrams of the fourth-stage airflow mill superfine pulverizing region D.

In conjunction with FIG. 27, FIG. 27(*a*) and FIG. 27(*b*), the upper airflow pipeline III38 and the upper spray nozzle III67 are fixed through the upper spray nozzle fastening nut III68 and the upper spray nozzle fastening bolt III69. The lower spray nozzle III67 is fixed onto the superfine pulverizing barrel I1118 through the upper spray nozzle fixing bolt 11170. The arrangement mode, the distribution and the inside structure of the upper spray nozzle are the same as those of the lower spray nozzle (the inner diameter of the upper spray nozzle equals to the inner diameter of the lower spray nozzle, $d_4=d_1$, $d_5=d_2$, $d_6=d_3$, and an included angle between the upper spray nozzle and the barrel diameter is $\gamma_2=\gamma_1=15°$), and it is not repeated therein.

The grading device uses the arc grading blades III28 When blades in other shapes (such as a rectangular shape and a triangular shape) are used, a backflow phenomenon occurs in a position near a blade outlet. When arc-shaped rotating cage blades are used, a flow field among the blades is stable, and this is relevant to the resistance coefficient of a grading inside structure. A resistance coefficient formula is:

$$C_D = \frac{F_D}{\frac{1}{2}\rho V^2 A}. \tag{10}$$

In the formula, $C_D$ represents a resistance coefficient, $F_D$ represents a resistance, p represents a fluid density, A represents a cross section area of an object in a vertical flowing direction, and V represents an airflow flowing speed.

From the resistance formula (10), it could be seen that the airflow flowing resistance can be reduced by reducing the cross section area. When the blades with the oval, triangular or rectangular cross section are used, the cross section area of channels among the blades changes, and the pressure intensity of each position will change along with the change of the cross section area, so that pressure difference resistance increase will be caused, and the airflow movement among the blades is irregular. When the arc-shaped blades are used, the cross section area of each position of the channels among the blades is the same, the pressure difference resistance is reduced, and the flow field among the blades is stable. The arc grading blades III28 are welded onto the grading blade connecting disc III19. An included angle between the two adjacent grading blades is $\gamma_3$, according to the present embodiment, $\gamma_3$=10° can be set, 36 identical grading blades are disposed along the circumference of the grading blade connecting disc, a space between the two adjacent grading blades is $L_3$=2r·sin 10, and the specific size can be determined according to the radius of the practical grading device.

In order to realize the separation function on the required particle size of particles, the particle diameter needs to be calculated as follows:

Under the condition of considering the gravity, the particle separation mainly has the two reasons, and on one hand, due to the inertial effect, the coarse particles cannot overcome the ascending dragging force, cannot enter the grading device and fall down along the wall surface edge. On the other hand, the dragging force on the coarse particles is small, and is insufficient to overcome the centrifugal force generated by the rotating blades to be thrown to the wall surface. Under the condition of only considering the second condition, a separation diameter expression can be obtained according to the stress balance relationship.

$$d_s = \sqrt{\frac{18\mu u_r}{(\rho_p - \rho)\omega^2 r}}. \tag{11}$$

In the formula, μ represents a fluid viscosity, $u_r$ represents a radial speed of the airflow at the grading blade edges, and is related to a flow rate of the pulverized gas medium and the size of the device, ω represents a rotating speed angle speed of grading blades, $\rho_p$ represents a particle density, ρ represents a gas density, and r represents a radius of a position of the blade edge.

From Formula (11), it can be seen that a small separation diameter can be obtained at a high grading rotating speed and a radial speed of the airflow at the grading blade edges.

A calculation formula of the radial speed $u_r$ is:

$$u_r = D^{-0.9} m^{0.7}\left(0.44 + 214\left(\frac{d_0}{D}\right)^2\right)\left(\frac{h}{D}\right)^{-0.9}\left(\frac{2r}{D}\right)^{-1.08}. \tag{12}$$

In the formula, h represents a height of a grading impeller, m represents a mass flow rate of gas in grading cavity, D represents a diameter of a grading cavity, $d_0$ represents a diameter of spray nozzle outlets, and h represents a height of a grading wheel.

From Formula (12), it can be seen that if the flow rate of gas entering the fourth-stage airflow mill superfine pulverizing region and the height-diameter ratio of a grading machine are smaller, and the diameter of the grading cavity is greater, the radial speed is smaller, the smaller separation diameter can be more favorably obtained, and the specific blade size can be determined according to the practical particle separation diameter.

Through the fourth-stage airflow mill superfine pulverizing region D, the size of the walnut shell particles can be controlled at 25 μm or smaller.

Embodiment II

Based on the above device, a same-cavity integrated vertical high-speed multistage superfine pulverizing method for walnut shells includes:

In a work process, double motors are started, and respectively drive respective connecting components to enter a high-speed rotating state. After walnut shells are broken to remove kernels, a great number of walnut shells are fed from a feeding hopper, and enter a double-channel spiral inclined chute from a bottom gap after sliding down along an inner wall, and uniformly slide down to a material lifting disc on the top of a same-cavity integrated vertical pulverizing device along double chutes, and the material lifting disc rotating at a high speed uniformly lifts the falling walnut shells into a wedge-shaped gap of a first-stage coarse crushing region through the material shifting teeth at the top. The walnut shells receive high-speed collision, shearing and extrusion effects of fine-pitch longitudinal trapezoidal teeth of a stator and a rotor in a process of sliding down along the wedge-shaped gap when the size of the walnut shells is the same as the size of a certain position of the wedge-shaped gap, and the walnut shells are crushed into coarse particles. The crushed shells continuously slide down to repeat the above process, and finally fall into a second-stage fine crushing region to be coarsely crushed at a certain particle size from a bottom outlet. The second-stage fine crushing region is a multistage wedge-shaped direct-through gradually reducing gap, and the coarsely crushed walnut shell particles slide down along an inner wall. Along with gradual reduction of the gap, the coarse particles receive the high-speed shearing and extrusion effects of fine-pitch transverse sharp tooth patterns on a stator and a rotor, and the coarse particles are further crushed into fine particles. The crushed shells continuously slide down to repeat the above process to be finely crushed, and finally, the walnut shells uniformly fall into the spiral chutes along the circumference of the barrel wall under the effect of centrifugal force of a high-speed rotor at a particle size suitable for pneumatic pulverization, and finally fall into a third-stage pneumatic impact micro pulverizing region through a barrel wall feeding opening. After falling to the barrel bottom, the fine particles move at a high speed by receiving the strong-force carrying effect of a supersonic airflow. The walnut shell fine particles violently rub and collide with each other in the process. The particles also receive strong collision by spiral gratings rotating around a lower main shaft at a high speed during high-speed drifting. The collided particles are rebounded to a rough barrel wall for repeated collision and rubbing. Finally, the particles are pulverized into microparticles, and the microparticles enter a fourth-stage airflow mill superfine pulverizing region along with an upward spiral airflow. Big particles which are not thoroughly pulverized can fall back into the barrel bottom to be pulverized again under the gravity effect due to pneumatic force weakening above the barrel. The walnut shell microparticles entering the fourth-stage airflow mill superfine pulverizing region receive high-speed collision and rubbing in a subsonic airflow mill to be further pulverized into superfine powder ascending along with the airflow. Powder particles meeting a particle size requirement are attracted out and collected through negative pressure attraction greater than centrifugal force through screening by grading blades. Big particles which do not meet the particle size requirement fall down to be further pulverized since the received negative pressure attraction is smaller than the centrifugal force.

The foregoing descriptions are merely preferred embodiments of the present invention, but not intended to limit the present invention. A person skilled in the art may make various alterations and variations to the present invention. Any modification, equivalent replacement, or improvement made within the spirit and principle of the present invention shall fall within the protection scope of the present invention.

The specific implementations of the present invention are described above with reference to the accompanying drawings, but not intended to limit the protection scope of the present invention. Those skilled in the art should understand that various modifications or deformations may be made without creative efforts based on the technical solutions of the present invention, and such modifications or deformations shall fall within the protection scope of the present invention.

What is claimed is:

1. A same-cavity integrated vertical high-speed multistage superfine pulverizing device for walnut shells, comprising:

a double-channel sliding type feeding device and a same-cavity integrated vertical pulverizing device, wherein the double-channel sliding type feeding device comprises a first spiral inclined chute and a second spiral inclined chute, which are oppositely arranged and configured to allow walnut shells to slide down through the first spiral inclined chute and the second spiral inclined chute into the same-cavity integrated vertical pulverizing device;

the same-cavity integrated vertical pulverizing device comprises a material lifting disc and a same-cavity integrated vertical pulverizing barrel, wherein the same-cavity integrated vertical pulverizing barrel is internally configured with a first-stage coarse crushing region, a second-stage fine crushing region, a third-stage pneumatic impact micro pulverizing region and a fourth-stage airflow mill superfine pulverizing region;

the material lifting disc is configured to uniformly lift the walnut shells that have slid down through the first spiral inclined chute and the second spiral inclined chute into a wedge-shaped gap of the first-stage coarse crushing region, wherein the first-stage coarse crushing region is configured to coarsely crush the walnut shells to produce coarsely crushed materials, and the second-stage fine crushing zone is configured to finely crush the coarsely crushed materials through a two-stage wedge-shaped direct-through gradually reducing gap to obtain finely crushed walnut shell particles;

the third-stage pneumatic impact micro pulverizing region is configured to perform high-speed collision on the finely crushed walnut shell particles, and the finely crushed walnut shell particles are subjected to collision and violent rubbing while being carried by a high-speed airflow for pulverizing; and the fourth-stage airflow mill superfine pulverizing region is configured to perform microparticle grading is using arc-shaped blades, and to attract out microparticles conforming to a particle size condition using negative pressure attraction.

2. The same-cavity integrated vertical high-speed multi-stage superfine pulverizing device for walnut shells according to claim 1, wherein the double-channel sliding type feeding device comprises the first spiral inclined chute and the second spiral inclined chute in opposite arrangement and welded onto a connecting plate, a feeding hopper is positioned above a feeding opening of the first spiral inclined chute and the second spiral inclined chute, and the feeding hopper is fixedly connected with the connecting plate through a bending connecting plate.

3. The same-cavity integrated vertical high-speed multi-stage superfine pulverizing device for walnut shells according to claim 1, further comprising a machine frame, wherein the machine frame comprises a horizontal chassis seat, fixed arc plates and support plates, a plurality of vertical upright posts are disposed on the horizontal chassis seat, two of the fixed arc plates are respectively connected onto the corresponding vertical upright posts to form a space for accommodating the same-cavity integrated vertical pulverizing device together with the horizontal chassis seat, the support plates in staggered arrangement are disposed on the upper ends of the vertical upright posts, and the double-channel sliding type feeding device is fixed through the support plates.

4. The same-cavity integrated vertical high-speed multi-stage superfine pulverizing device for walnut shells according to claim 1, wherein the material lifting disc synchronously rotates at a high speed along with an upper main shaft, material shifting teeth are disposed on the top of the material lifting disc, which is adapted to uniformly lift the falling walnut shells into the wedge-shaped gap of the first-stage coarse crushing region.

5. The same-cavity integrated vertical high-speed multi-stage superfine pulverizing device for walnut shells according to claim 1, wherein the first-stage coarse crushing region consists of an upper stator and an upper rotor, using the wedge-shaped gap to achieve coarse crushing, the upper stator is fixed to a barrel wall, and the upper rotor is in keyed joint with the upper main shaft to synchronously rotate; and the upper stator and the upper rotor both use fine- pitch longitudinal trapezoidal teeth.

6. The same-cavity integrated vertical high-speed multi-stage superfine pulverizing device for walnut shells according to claim 1, wherein the second-stage fine crushing region consists of a lower stator and a lower rotor, using the two-stage wedge-shaped direct-through gradually reducing gap to achieve fine crushing, the lower stator is fixed to a barrel wall, and the lower rotor is in keyed joint with the upper main shaft to synchronously rotate; and the lower stator and the lower rotor both use fine-pitch transverse sharp patterned teeth.

7. The same-cavity integrated vertical high-speed multi-stage superfine pulverizing device for walnut shells according to claim 1, wherein the third-stage pneumatic impact micro pulverizing region comprises lower airflow guide pipes, lower spray nozzles, spiral crushing gratings and an inner lining layer, the lower airflow guide pipes are respectively connected with the lower spray nozzles, the lower spray nozzles are connected with a barrel, spray nozzle outlets are connected with the barrel in a penetrating way, the spiral crushing gratings are welded to a lower main shaft, providing high-speed collision on the finely crushed walnut shell particles, assisting in pulverization, tooth-shaped micro bulges are disposed on an inner surface of the inner lining layer, and the tooth-shaped micro bulges are adapted to engage with the finely crushed walnut shell particles carried by a high-speed airflow, thus effectuating pulverization through collision and violently rubbing.

8. The same-cavity integrated vertical high-speed multi-stage superfine pulverizing device for walnut shells according to claim 1, wherein the fourth-stage airflow mill superfine pulverizing region comprises upper airflow guide pipes, upper spray nozzles, a grading device and a negative pressure material attraction device, and the upper airflow guide pipes are respectively connected with the upper spray nozzles;

and the upper spray nozzles are connected to the barrel, and spray nozzle outlets are connected with an inner barrel in a penetrating way.

9. The same-cavity integrated vertical high-speed multi-stage superfine pulverizing device for walnut shells according to claim 8, wherein the grading device consists of arc-shaped blades, channels of the arc-shaped blades are configured to have equal cross section areas throughout to reduce pressure difference resistance and stabilize a flow field between the blades, thereby facilitating the microparticle grading, and the negative pressure material attraction device provides negative pressure attraction to attract out and collect microparticles that conform to the particle size condition.

10. A same-cavity integrated vertical high-speed multi-stage superfine pulverizing method for walnut shells, comprising:

lifting the walnut shells after being broken to remove kernels to a wedge-shaped gap of a first-stage coarse crushing region, so that the walnut shells receive high-speed collision, shearing and extrusion effects of fine-pitch longitudinal trapezoidal teeth of a stator and a rotor in a process of sliding down along the wedge-shaped gap when the size of the walnut shells is the same as the size of a certain position of the wedge-shaped gap, and the walnut shells are crushed into coarse particles to fall into a second-stage fine crushing region to realize coarse crushing;

enabling the coarsely crushed walnut shell particles to slide down along an inner wall since the second-stage fine crushing region is a multistage wedge-shaped direct-through gradually reducing gap, along with gradual reduction of the gap, enabling the coarse particles to receive the high-speed shearing and extrusion effects of fine-pitch transverse sharp patterned teeth on a stator and a rotor, and further crushing the coarse particles into fine particles;

sliding the fine particles to a third-stage pneumatic impact micro pulverizing region, and enabling the fine particles to move at a high speed through receiving the strong-force carrying effect of a supersonic airflow, so that the walnut shell fine particles violently rub and collide with each other in the process; enabling the particles to receive strong collision by spiral gratings rotating around a lower main shaft at a high speed during high-speed drifting, rebounding the collided particles to a rough barrel wall for repeated collision and rubbing, finally pulverizing the particles into microparticles, and enabling the microparticles to enter a fourth-stage airflow mill superfine pulverizing region along with an upward spiral airflow; and enabling the walnut shell microparticles entering the fourth-stage airflow mill superfine pulverizing region to receive high-speed collision and rubbing in a subsonic airflow mill to be further pulverized into superfine powder ascending along with the airflow, and attracting out powder particles meeting a particle size requirement through negative pressure attraction greater than centrifugal force through screening by grading blades.

* * * * *